United States Patent
Beard et al.

(10) Patent No.: US 12,257,573 B2
(45) Date of Patent: Mar. 25, 2025

(54) MULTIFUNCTIONAL CATALYST FOR HYDROCARBON OXIDATION AND SELECTIVE CATALYTIC REDUCTION OF NOx

(71) Applicant: BASF MOBILE EMISSIONS CATALYSTS LLC, Iselin, NJ (US)

(72) Inventors: Kevin Beard, Iselin, NJ (US); Joseph A. Patchett, Iselin, NJ (US); Edgar Viktor Huennekes, Hannover (DE); Jan Martin Becker, Hannover (DE); John K. Hochmuth, Raritan, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 77 days.

(21) Appl. No.: 17/753,561

(22) PCT Filed: Sep. 29, 2020

(86) PCT No.: PCT/EP2020/077213
§ 371 (c)(1),
(2) Date: Mar. 8, 2022

(87) PCT Pub. No.: WO2021/063939
PCT Pub. Date: Apr. 8, 2021

(65) Prior Publication Data
US 2024/0001354 A1   Jan. 4, 2024

(30) Foreign Application Priority Data
Sep. 30, 2019 (EP) .................. 19200513

(51) Int. Cl.
*B01J 35/56* (2024.01)
*B01D 53/72* (2006.01)
(Continued)

(52) U.S. Cl.
CPC .............. *B01J 35/19* (2024.01); *B01D 53/72* (2013.01); *B01D 53/9418* (2013.01);
(Continued)

(58) Field of Classification Search
CPC ... B01J 35/19; B01J 35/56; B01J 21/08; B01J 23/002; B01J 23/63; B01J 23/888;
(Continued)

(56) References Cited

U.S. PATENT DOCUMENTS 5,371,056 A   12/1994 Leyrer et al.
5,409,681 A   4/1995 Kato et al.
(Continued)

FOREIGN PATENT DOCUMENTS

DE   69205669 T2   3/1996
EP   2 878 368 A1   6/2015
(Continued)

OTHER PUBLICATIONS

International Search Report dated Dec. 1, 2020, PCT/EP2020/077213.
(Continued)

*Primary Examiner* — Dapinder Singh
(74) *Attorney, Agent, or Firm* — DLA Piper LLP (US)

(57) ABSTRACT

The present invention relates to a catalyst for the oxidation of hydrocarbon and the selective catalytic reduction of nitrogen oxides, the catalyst comprising a substrate comprising an inlet end, an outlet end, a substrate axial length extending from the inlet end to the outlet end and a plurality of passages defined by internal walls of the substrate extending therethrough; and a coating disposed on the surface of the internal walls of the substrate, wherein the surface de-fines the interface between the passages and the internal walls, wherein the coating comprises a platinum group metal component supported on a first oxidic material and further
(Continued)

comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, wherein the mixed oxide is supported on a second oxidic material.

12 Claims, 4 Drawing Sheets

(51) Int. Cl.
| | |
|---|---|
| B01D 53/94 | (2006.01) |
| B01J 21/08 | (2006.01) |
| B01J 23/10 | (2006.01) |
| B01J 23/30 | (2006.01) |
| B01J 23/44 | (2006.01) |
| B01J 23/84 | (2006.01) |
| B01J 23/847 | (2006.01) |
| B01J 35/00 | (2006.01) |
| B01J 37/02 | (2006.01) |
| B01J 37/08 | (2006.01) |
| F01N 3/02 | (2006.01) |
| F01N 3/022 | (2006.01) |
| F01N 3/10 | (2006.01) |
| F01N 3/20 | (2006.01) |
| F01N 3/28 | (2006.01) |

(52) U.S. Cl.
CPC .......... *B01D 53/9468* (2013.01); *B01J 21/08* (2013.01); *B01J 23/10* (2013.01); *B01J 23/30* (2013.01); *B01J 23/44* (2013.01); *B01J 23/8472* (2013.01); *B01J 35/56* (2024.01); *B01J 37/0201* (2013.01); *B01J 37/0228* (2013.01); *B01J 37/0244* (2013.01); *B01J 37/0248* (2013.01); *B01J 37/082* (2013.01); *F01N 3/0222* (2013.01); *F01N 3/106* (2013.01); *F01N 3/2066* (2013.01); *F01N 3/2828* (2013.01); *B01D 2255/1023* (2013.01); *B01D 2255/20723* (2013.01); *B01D 2255/20738* (2013.01); *B01D 2255/9022* (2013.01); *B01D 2255/9155* (2013.01); *B01D 2257/404* (2013.01); *B01D 2257/702* (2013.01); *B01D 2258/012* (2013.01); *F01N 2370/04* (2013.01)

(58) Field of Classification Search
CPC ... B01J 23/10; B01J 23/30; B01J 23/44; B01J 23/8472; B01J 23/6482; B01J 23/8993; B01J 37/0201; B01J 37/0228; B01J 37/0244; B01J 37/0248; B01J 37/082; B01J 37/0215; B01J 2523/00; B01J 2523/3706; B01J 2523/48; B01J 2523/49; B01J 2523/824; B01J 2523/41; B01J 2523/47; B01J 2523/55; B01J 2523/69; B01J 2523/842; B01J 2523/31; F01N 3/0222; F01N 3/106; F01N 3/2066; F01N 3/2828; F01N 2370/04; B01D 53/72; B01D 53/9418; B01D 53/9468; B01D 53/944; B01D 53/56; B01D 53/94; B01D 2255/1023; B01D 2255/20723; B01D 2255/20738; B01D 2255/9022; B01D 2255/9155; B01D 2255/2098; B01D 2257/404; B01D 2257/702; B01D 2258/012; Y02C 20/10

See application file for complete search history.

(56) References Cited

U.S. PATENT DOCUMENTS

| | | | | |
|---|---|---|---|---|
| 8,591,820 | B2* | 11/2013 | Boger | F01N 3/0842 |
| | | | | 264/630 |
| 9,687,785 | B2* | 6/2017 | Chen | F01N 3/0222 |
| 10,060,312 | B2* | 8/2018 | Suzawa | F01N 3/0222 |
| 2008/0044319 | A1* | 2/2008 | Takahashi | B01J 37/02 |
| | | | | 422/177 |
| 2008/0141661 | A1* | 6/2008 | Voss | B01D 53/9413 |
| | | | | 60/301 |
| 2010/0180561 | A1* | 7/2010 | Beall | B01D 46/2429 |
| | | | | 55/476 |
| 2010/0247396 | A1* | 9/2010 | Zuberi | F01N 3/0226 |
| | | | | 422/169 |
| 2010/0269491 | A1* | 10/2010 | Boorse | F01N 3/035 |
| | | | | 60/299 |
| 2015/0375207 | A1 | 12/2015 | Castellino et al. | |
| 2018/0193797 | A1* | 7/2018 | Johansen | F01N 3/2066 |

FOREIGN PATENT DOCUMENTS

| | | |
|---|---|---|
| WO | 2018104310 A1 | 6/2018 |
| WO | WO 2018/224651 A2 | 12/2018 |

OTHER PUBLICATIONS

Zheng Lei et al., "Selective Catalytic Redction of Noxwith Ammonia . . . ," Topics in Catalysts, vol. 62, No. 1, Dec. 18, 2018, pp. 129-139.

Liu Fudong et al., "Highly dispersed iron vanadate catalyst supported on Ti02 for the selective . . . ," Journal of Catalysts, vol. 307, Sep. 17, 2013, pp. 340-351.

* cited by examiner

MULTIFUNCTIONAL CATALYST FOR HYDROCARBON OXIDATION AND SELECTIVE CATALYTIC REDUCTION OF NOx

This application is a national stage filing under 35 U.S.C. § 371 of International Application No. PCT/EP2020/077213, filed on Sep. 29, 2020, which claims the benefit of priority to European Application No. 19200513.0, filed on Sep. 30, 2019; the disclosure of each of these applications are each incorporated herein by reference in their entirety.

The present invention relates to a catalyst for the oxidation of hydrocarbon and the selective catalytic reduction of nitrogen oxides, a process for preparing a catalyst for the oxidation of hydrocarbon and the selective catalytic reduction of nitrogen oxides, and a catalyst obtainable or obtained by the process of the present invention. Further, the present invention relates to an exhaust gas treatment system comprising said catalyst.

The selective catalytic reduction (SCR) catalysts available on the market permit in the close-coupled position to allow faster warm-up on transient and in-service conformity cycles by positioning such catalysts upstream of the filter. Improvement in cycle deNOx may be realized. However, these catalysts when located in the close-coupled position are not able to regenerate, to remove sulfur, or to be resistant to sulfur to achieve high NOx conversion over the lifecycle of a catalyst. US 2015/0375207 A1 discloses a layered catalyst with combined function, namely the removal of CO and NOx, the catalyst comprises an oxidation layer (top layer) and an ammonia-SCR catalyst layer (bottom layer) on a substrate. U.S. Pat. No. 5,371,056 discloses an oxidative control diesel catalyst comprising a flow-through substrate, an activity promoting dispersion coating as support for active components. WO 2018/224651 A2 discloses a system comprising a Pd-containing SCR catalyst in the close-coupled position, a layered Pd-zirconia and Cu-zeolite design. However, said catalyst has a deficiency with respect to desulfation in the cc-position.

Vanadium-based SCR catalysts are known for their sulfur tolerance. They can also offer mild hydrocarbon (HC) oxidation performance. However, high temperatures resulting from an accidental hydrocarbon exotherm can result in irreversible deactivation of the catalyst.

Therefore a highly stable vanadium-containing catalyst might be a pre-requisite for close-coupled application. Indeed, the present invention aims to improve Heavy-Duty Diesel (HDD) systems in order to fulfil the Euro VI, Euro VII and CARB requirements.

Therefore, it was an object of the present invention to provide a multifunctional catalyst for the oxidation of hydrocarbon and the selective catalytic reduction of NOx which has improved catalytic performance, such as excellent HC oxidation and SCR of NOx, while reducing the emission of nitrous oxide. Surprisingly it was found that the multifunctional catalyst for hydrocarbon oxidation and selective catalytic reduction of NOx according to the present invention permits to achieve improved catalytic performance, such as excellent HC oxidation and SCR of NOx, while reducing the emission of nitrous oxide. In addition, this present invention takes advantage of the desulfation benefits of vanadia supported on an oxidic material, such as titania.

Therefore, the present invention relates to a catalyst for the oxidation of hydrocarbon and the selective catalytic reduction of nitrogen oxides, the catalyst comprising (i) a substrate comprising an inlet end, an outlet end, a substrate axial length extending from the inlet end to the outlet end and a plurality of passages defined by internal walls of the substrate extending therethrough;

(ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, wherein the mixed oxide is supported on a second oxidic material.

As to the substrate (i), it is preferred that it is a flow-through substrate or alternatively a wall-flow filter substrate. It is more preferred that the substrate (i) is a flow-through substrate.

As to the substrate (i), it is preferred that it comprises, more preferably consists of, a ceramic substance, wherein the ceramic substance more preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite. It is more preferred that the substrate (i) comprises, more preferably consists of, a ceramic substance, wherein the ceramic substance more preferably comprises, more preferably consists of, a cordierite.

It is preferred that the platinum group metal component comprises, more preferably consists of, one or more of palladium, platinum, rhodium and iridium, more preferably one or more of palladium, platinum and rhodium, more preferably one or more of palladium and rhodium. It is more preferred that the platinum group metal component comprises, more preferably consists of, palladium.

As to the amount of the platinum group metal component, it is preferred that the coating comprises the platinum group metal component at a loading, calculated as elemental platinum group metal, in the range of from 2 to 70 g/ft$^3$, more preferably in the range of from 5 to 50 g/ft$^3$, more preferably in the range of from 10 to 30 g/ft$^3$, more preferably in the range of from 12 to 20 g/ft$^3$.

Therefore, the present invention preferably relates to a catalyst for the oxidation of hydrocarbon and the selective catalytic reduction of nitrogen oxides, the catalyst comprising (i) a flow-through substrate comprising an inlet end, an outlet end, a substrate axial length extending from the inlet end to the outlet end and a plurality of passages defined by internal walls of the substrate extending therethrough;

(ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, wherein the mixed oxide is supported on a second oxidic material, wherein the platinum group metal component comprises, more preferably consists of, one or more of palladium, platinum, rhodium and iridium, more preferably one or more of palladium, platinum and rhodium, more preferably one or more of palladium and rhodium, more preferably palladium.

In the context of the present invention, as to the first oxidic material, it is preferred that it comprises one or more oxides, more preferably one or more of a zirconium oxide, an aluminum oxide, a silicon oxide and a titanium oxide, more preferably one or more of a zirconium oxide, an aluminum oxide, and a silicon oxide.

It is more preferred that the first oxidic material comprises a zirconium oxide. It is more preferred that from 75 to 100 weight-%, more preferably from 80 to 98 weight-%, more preferably from 85 to 95 weight-%, of the first oxidic material consist of zirconia.

It is more preferred that the first oxidic material further comprises one or more of a hafnium oxide and a lanthanum oxide, more preferably a hafnium oxide and a lanthanum oxide. It is more preferred that from 98 to 100 weight-%, more preferably from 99 to 100 weight-%, more preferably from 99.5 to 100 weight-%, more preferably from 99.9 to 100 weight-%, of the first oxidic material consist of zirconia, an hafnium oxide and a lanthanum oxide. It is more preferred that from 80 to 98 weight-%, more preferably from 85 to 95 weight-%, of the first oxidic material consist of zirconia, from 1.5 to 15 weight-%, more preferably from 4 to 12 weight-%, of the first oxidic material consist of a lanthanum oxide and from 0.5 to 5 weight-%, more preferably from 1 to 3 weight-%, of the first oxidic material consist of a hafnium oxide.

Alternatively, it is more preferred that the first oxidic material comprises an aluminum oxide. It is more preferred that from 70 to 100 weight-%, more preferably from 72 to 95 weight-%, more preferably from 75 to 85 weight-%, of the first oxidic material consist of alumina.

It is more preferred that the first oxidic material further comprises one or more of a lanthanum oxide and a zirconium oxide, more preferably a lanthanum oxide and a zirconium oxide. It is more preferred that from 98 to 100 weight-%, more preferably from 99 to 100 weight-%, more preferably from 99.5 to 100 weight-%, more preferably from 99.9 to 100 weight-%, of the first oxidic material consist of alumina, a zirconium oxide and a lanthanum oxide. It is more preferred that from 72 to 95 weight-%, more preferably from 75 to 85 weight-%, of the first oxidic material consist of alumina, from 4 to 24 weight-%, more preferably from 14 to 22 weight-%, of the first oxidic material consist of a zirconium oxide and from 1 to 4 weight-%, more preferably from 1 to 3 weight-%, of the first oxidic material consist of a lanthanum oxide.

As to the amount of the first oxidic material, it is preferred that the coating comprises the first oxidic material at a loading in the range of from 0.25 to 1 g/in$^3$, more preferably in the range of from 0.30 to 0.80 g/in$^3$, more preferably in the range of from 0.40 to 0.70 g/in$^3$.

As to the mixed oxide, it is preferred that it is a mixed oxide of vanadium and one or more of iron, erbium, bismuth, aluminum and antimony, more preferably one or more of iron, erbium, bismuth and antimony, more preferably one or more of iron and antimony. It is more preferred that the mixed oxide is a mixed oxide of vanadium and iron.

It is preferred that, in the mixed oxide, the molar ratio of the one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the vanadium, X:V, is in the range of from 1:1.5 to 1.5:1, more preferably in the range of from 1:1.2 to 1.2:1, more preferably in the range of from 1:1.1 to 1.1:1.

Therefore, the present invention preferably relates to a catalyst for the oxidation of hydrocarbon and the selective catalytic reduction of nitrogen oxides, the catalyst comprising (i) a flow-through substrate comprising an inlet end, an outlet end, a substrate axial length extending from the inlet end to the outlet end and a plurality of passages defined by internal walls of the substrate extending therethrough;

(ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and iron supported on a second oxidic material, wherein the platinum group metal component comprises, more preferably consists of, one or more of palladium, platinum, rhodium and iridium, more preferably one or more of palladium, platinum and rhodium, more preferably one or more of palladium and rhodium, more preferably palladium;

wherein, in the mixed oxide, the molar ratio of iron to vanadium, X:V, more preferably is in the range of from 1:1.5 to 1.5:1, more preferably in the range of from 1:1.2 to 1.2:1, more preferably in the range of from 1:1.1 to 1.1:1.

In the context of the present invention, as to the second oxidic material supporting the mixed oxide, it is preferred that it comprises one or more oxides, more preferably one or more of a titanium oxide, an aluminum oxide, a silicon oxide and a zirconium oxide, more preferably one or more of a titanium oxide and a silicon oxide, more preferably a titanium oxide, more preferably titania.

It is more preferred that the second oxidic material comprises a titanium oxide, more preferably titania, and one or more of a tungsten oxide, a silicon oxide, an antimony oxide and a cerium oxide, more preferably one or more of a tungsten oxide and silicon oxide, more preferably a tungsten oxide. It is more preferred that the tungsten oxide is impregnated on the titania.

Preferably from 75 to 100 weight-%, more preferably from 80 to 99 weight-%, more preferably from 85 to 95 weight-% of the second oxidic material consist of titania.

Preferably from 98 to 100 weight-%, more preferably from 99 to 100 weight-%, more preferably from 99.5 to 100 weight-%, more preferably from 99.9 to 100 weight-% of the second oxidic material consist of titania and tungsten oxide, wherein more preferably from 80 to 99 weight-%, more preferably 85 to 95 weight-% of the second oxidic material consist of titania and from 1 to 20 weight-%, more preferably from 5 to 15 weight-% of the second oxidic material consist of tungsten oxide.

It is preferred that from 50 to 90 weight-%, more preferably from 65 to 85 weight-%, more preferably from 70 to 80 weight-%, of the coating consist of the second oxidic material.

As to the amount of the mixed oxide, it is preferred that it is in the range of from 3 to 25 weight-%, more preferably in the range of from 5 to 18 weight-%, more preferably in the range of from 7 to 16 weight-%, more preferably in the range of from 9 to 15 weight-%, more preferably in the range of from 10 to 14.5 weight-%, based on the weight of the second oxidic material.

It is preferred that the coating further comprises an oxidic binder, wherein the oxidic binder more preferably comprises one or more of zirconia, alumina, titania, silica and a mixed oxide comprising two or more of Zr, Al, Ti and Si, wherein the oxidic binder more preferably comprises one or more of alumina and silica, more preferably silica.

It is preferred that, in the catalyst, the coating comprises from 1 to 10 weight-%, more preferably from 2 to 8 weight-%, more preferably from 3 to 6 weight-% of the oxidic binder based on the weight of the second oxidic material.

It is preferred that the catalyst comprises the coating at a loading in the range of from 2.5 to 10 g/in$^3$, more preferably in the range of from 3 to 8 g/in$^3$, more preferably in the range of from 3.5 to 6 g/in$^3$.

It is preferred that the coating is disposed on the surface of the internal walls of the substrate over z % of the substrate axial length, wherein z ranges from 90 to 100, more preferably from 95 to 100, more preferably from 98 to 100, more preferably from 99 to 100.

According to a first aspect of the present invention, it is preferred that the coating according to
(ii) comprises, more preferably consists of:
(ii.1) a bottom coat comprising the mixed oxide supported on the second oxidic material;
(ii.2) a top coat comprising the platinum group metal component supported on the first oxidic material;
wherein the bottom coat is disposed on the surface of the internal walls of the substrate over x % of the substrate axial length, wherein x ranges from 90 to 100, more preferably from 95 to 100, more preferably from 98 to 100, more preferably from 99 to 100;
wherein the top coat is disposed on the bottom coat over y % of the substrate axial length, wherein y ranges from 90 to 100, more preferably from 95 to 100, more preferably from 98 to 100, more preferably from 99 to 100.

It is preferred according to said aspect that x=y.

It is preferred according to said aspect that the second oxidic material supporting the mixed oxide comprised in the bottom coat (ii.1) is as defined in the foregoing.

It is preferred according to said aspect that the bottom coat according to (ii.1) further comprises the oxidic binder as defined in the foregoing.

It is preferred that from 98 to 100 weight-%, more preferably from 99 to 100 weight-%, more preferably from 99.5 to 100 weight-%, more preferably from 99.9 to 100 weight-%, of the bottom coat according to (ii.1) consist of the mixed oxide, the second oxidic material, and more preferably an oxidic binder as defined in the foregoing.

It is preferred according to said aspect that from 0 to 0.001 weight-%, more preferably from 0 to 0.0001 weight-%, more preferably from 0 to 0.00001 weight-%, more preferably from 0 to 0.000001 weight-%, of the bottom coat according to (ii.1) consist of palladium, more preferably of palladium and platinum, more preferably of a platinum group metal component. In other words, it is preferred that the bottom coat according to (ii.1) is substantially free, more preferably free, of palladium, more preferably of palladium and platinum, more preferably of a platinum group metal component.

It is preferred according to said aspect that the catalyst comprises the bottom coat according to (ii.1) at a loading in the range of from 2.2 to 7 g/in$^3$, more preferably in the range of from 2.6 to 6 g/in$^3$, more preferably in the range of from 3.1 to 5 g/in$^3$.

It is preferred according to said aspect that the top coat according to (ii.2) further comprises an oxidic component, wherein the oxidic component more preferably comprises one or more of zirconia, alumina, titania, silica and a mixed oxide comprising two or more of Zr, Al, Ti and Si. It is more preferred that the oxidic component comprises one or more of zirconia and alumina, more preferably zirconia.

It is preferred according to said aspect that the top coat according to (ii.2) comprises the oxidic component in an amount in the range of from 2 to 20 weight-%, more preferably in the range of from 5 to 15 weight-%, more preferably in the range of from 7 to 13 weight-%, based on the weight of the first oxidic material.

Preferably from 98 to 100 weight-%, more preferably from 99 to 100 weight-%, more preferably from 99.5 to 100 weight-%, more preferably from 99.9 to 100 weight-%, of the top coat according to (ii.2) consist of the platinum group metal component, more preferably palladium, the first oxidic material, and more preferably an oxidic component as defined in the foregoing.

It is preferred that from 0 to 0.1 weight-%, more preferably from 0 to 0.01 weight-%, more preferably from 0 to 0.001 weight-%, more preferably from 0 to 0.0001 weight-%, of the top coat according to (ii.2) consist of vanadium. In other words, it is preferred that the top coat according to (ii.2) is substantially free, more preferably free, of vanadium.

It is preferred according to said aspect that from 0 to 0.001 weight-%, more preferably from 0 to 0.0001 weight-%, more preferably from 0 to 0.00001 weight-%, more preferably from 0 to 0.000001 weight-%, of the top coat according to (ii.2) consist of platinum. In other words, it is preferred that the top coat according to (ii.2) is substantially free, more preferably free, of platinum.

It is preferred according to said aspect that the catalyst comprises the top coat according to (ii.2) at a loading in the range of from 0.3 to 3 g/in$^3$, more preferably in the range of from 0.4 to 2 g/in$^3$, more preferably in the range of from 0.4 to 1 g/in$^3$.

Therefore, the present invention preferably relates to a catalyst for the oxidation of hydrocarbon and the selective catalytic reduction of nitrogen oxides, the catalyst comprising
(i) a substrate comprising an inlet end, an outlet end, a substrate axial length extending from the inlet end to the outlet end and a plurality of passages defined by internal walls of the substrate extending therethrough;
(ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and iron supported on a second oxidic material, wherein the coating comprises, more preferably consists of:
(ii.1) a bottom coat comprising the mixed oxide supported on the second oxidic material;
(ii.2) a top coat comprising the platinum group metal component supported on the first oxidic material;
wherein the bottom coat is disposed on the surface of the internal walls of the substrate over x % of the substrate axial length, wherein x ranges from 90 to 100;
wherein the top coat is disposed on the bottom coat over y % of the substrate axial length, wherein y ranges from 90 to 100;
wherein the platinum group metal component comprises, more preferably consists of, one or more of palladium, platinum, rhodium and iridium, more preferably one or more of palladium, platinum and rhodium, more preferably one or more of palladium and rhodium, more preferably palladium.

According to a second aspect of the present invention, it is preferred that the coating according to (ii) consists of one coat, wherein the coat is disposed on the surface of the internal walls of the substrate over z % of the substrate axial length, wherein z ranges from 90 to 100, more preferably from 95 to 100, more preferably from 98 to 100, more preferably from 99 to 100.

Therefore, the present invention preferably relates to a catalyst for the oxidation of hydrocarbon and the selective catalytic reduction of nitrogen oxides, the catalyst comprising (i) a substrate comprising an inlet end, an outlet end, a substrate axial length extending from the inlet end to the outlet end and a plurality of passages defined by internal walls of the substrate extending therethrough;

(ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and iron supported on a second oxidic material, wherein the coating consists of one coat, wherein the coat is disposed on the surface of the internal walls of the substrate over z % of the substrate axial length, wherein z ranges from 90 to 100, more preferably from 95 to 100, more preferably from 98 to 100, more preferably from 99 to 100;

wherein the platinum group metal component comprises, more preferably consists of, one or more of palladium, platinum, rhodium and iridium, more preferably one or more of palladium, platinum and rhodium, more preferably one or more of palladium and rhodium, more preferably palladium.

According to a third aspect of the present invention, it is conceivable and preferred that the order of the coats in the first aspect be reversed such that the bottom coat (ii.1) according to the first aspect is a top coat according to the third aspect of the present invention and that the top coat (ii.2) of the first aspect is a bottom coat according to the third aspect. Hence, it is preferred that the bottom coat according to the third aspect comprises the platinum group metal component supported on the first oxidic material and that the top coat according to the third aspect comprises the mixed oxide supported on the second oxidic material.

According to a fourth aspect of the present invention, it is conceivable and preferred that the two coats described according to the first aspect of the present invention be positioned in a zoned configuration. In particular, it is preferred that the coating according to (ii) comprises, more preferably consists of:

(ii.1') a bottom coat comprising the mixed oxide supported on the second oxidic material;

(ii.2') a top coat comprising the platinum group metal component supported on the first oxidic material;

wherein the bottom coat is disposed on the surface of the internal walls of the substrate over x' % of the substrate axial length, wherein x' ranges from 20 to 80, more preferably from 30 to 70, more preferably from 40 to 60, more preferably from 45 to 55, from the inlet end to the outlet end of the substrate;

wherein the top coat is disposed on the surface of the internal walls of the substrate over y' % of the substrate axial length, wherein y' ranges from 20 to 80, more preferably from 30 to 70, more preferably from 40 to 60, more preferably from 45 to 55, from the outlet end to the inlet end of the substrate. It is more preferred that $90 \leq x'+y' \leq 100$.

In the context of the present invention, it is preferred that from 98 to 100 weight-%, more preferably from 99 to 100 weight-%, more preferably from 99.5 to 100 weight-%, more preferably from 99.9 to 100 weight-%, of the coating consist of the platinum group metal component supported on the first oxidic material, the mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, supported on the second oxidic material, and more preferably an oxidic binder as defined in the foregoing, and optionally an oxidic component as defined in the foregoing.

It is preferred that from 0 to 0.1 weight-%, more preferably from 0 to 0.01 weight-%, more preferably from 0 to 0.001 weight-%, more preferably from 0 to 0.0001 weight-%, of the coating according to (ii) consist of a zeolitic material, preferably of a molecular sieve. In other words, it is preferred that the coating according to (ii) is substantially free, more preferably free, of a zeolitic material, more preferably of a molecular sieve.

It is preferred that the catalyst of the present invention consists of the substrate (i) and the coating (ii).

Further, the present invention relates to a process for preparing a catalyst for the oxidation of hydrocarbon and the selective catalytic reduction of nitrogen oxides, preferably the catalyst according to the present invention and as defined in the foregoing, comprising (a) providing a substrate comprising an inlet end, an outlet end, a substrate axial length extending from the inlet end to the outlet end and a plurality of passages defined by internal walls of the substrate extending therethrough;

(b) providing one or more mixtures comprising a source of a platinum group metal component, particles of a first oxidic material, water, particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, a second oxidic material and more preferably an oxidic binder as defined in the foregoing, disposing said one or more mixtures over z % of the substrate axial length, wherein z ranges from 90 to 100, calcining the one or more mixtures disposed on the substrate. The components used in the process preferably are as defined in the foregoing.

It is preferred that the particles of the mixed oxide have a Dv50 in the range of from 0.5 to 4 micrometers, more preferably in the range of from 0.75 to 3.5 micrometers, more preferably in the range of from 1 to 3 micrometers, the Dv50 being determined as defined in Reference Example 1.

It is preferred that the particles of the mixed oxide have a Dv90 in the range of from 5 to 20 micrometers, more preferably in the range of from 7 to 15 micrometers, more preferably in the range of from 9 to 13 micrometers, the Dv90 being determined as defined in Reference Example 1.

It is preferred that the particles of the first oxidic material, more preferably comprising zirconia, have a Dv50 in the range of from 0.5 to 8 micrometers, more preferably in the range of from 1 to 6 micrometers, more preferably in the range of from 2 to 5 micrometers, the Dv50 being determined as defined in Reference Example 1. Alternatively, it is preferred that the particles of the first oxidic material, more preferably comprising alumina, have a Dv50 in the range of from 20 to micrometers, more preferably in the range of from 25 to 40 micrometers, more preferably in the range of from 28 to 35 micrometers, the Dv50 being determined as defined in Reference Example 1.

It is preferred that the particles of the first oxidic material, more preferably comprising zirconia, have a Dv90 in the range of from 6 to 30 micrometers, more preferably in the range of from 10 to 20 micrometers, more preferably in the range of from 12 to 18 micrometers, the Dv90 being determined as defined in Reference Example 1. Alternatively, it is preferred that the particles of the first oxidic material, more preferably comprising alumina, have a Dv90 in the range of from to 75 micrometers, more preferably in the range of from 55 to 70 micrometers, more preferably in the range of from 60 to 66 micrometers, the Dv90 being determined as defined in Reference Example 1.

It is preferred that the particles of the second oxidic material have a Dv50 in the range of from 0.1 to 4 micrometers, more preferably in the range of from 0.25 to 3 micrometers, more preferably in the range of from 0.5 to 2 micrometers, the Dv50 being determined as defined in Reference Example 1.

It is preferred that the particles of the second oxidic material have a Dv90 in the range of from 0.5 to 8 micrometers, more preferably in the range of from 1 to 6 micrometers, more preferably in the range of from 2 to 5 micrometers, the Dv90 being determined as defined in Reference Example 1.

As to (b), it is preferred that it comprises, more preferably consists of,
- (b.1) impregnating the source of a platinum group metal component onto the first oxidic material, obtaining an impregnated first oxidic material, more preferably calcining the impregnated oxidic material, and forming a mixture with water and the impregnated oxidic material;
- (b.2) forming a mixture with water, the particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and the second oxidic material;
- (b.3) more preferably adding an oxidic binder to the mixture obtained in (b.2);
- (b.4) admixing the impregnated oxidic material mixture obtained in (b.1), more preferably the mixture with the calcined impregnated oxidic material obtained in (b.1), with the mixture obtained in (b.2), more preferably in (b.3), more preferably setting the pH of the aqueous phase of the obtained mixture to a value ranging from 6 to 8, more preferably from 6.5 to 7.5, by optionally adding a base, more preferably an organic base, obtaining a final mixture;
- (b.5) disposing the final mixture obtained in (b.4) on the surface of the internal walls of the substrate provided in (a), wherein the surface defines the interface between the passages and the internal walls of the substrate, more preferably over z % of the substrate axial length, wherein z ranges from 95 to 10, more preferably from 98 to 100, more preferably from 99 to 100;
- (b.6) optionally drying the mixture disposed on the substrate obtained in (b.5), obtaining a dried mixture-treated substrate;
- (b.7) calcining the mixture disposed on the substrate obtained in (b.5), more preferably the dried mixture-treated substrate obtained in (b.6), in a gas atmosphere, more preferably having a temperature in the range of from 350 to 600° C., more preferably in the range of from 400 to 500° C., and optionally
  - (b'.5) disposing the final mixture obtained in (b.4) on the surface of the coating disposed on the substrate as obtained in (b.7);
  - (b'.6) optionally drying the mixture-treated substrate obtained in (b'.5);
  - (b'.7) calcining the mixture-treated substrate obtained in (b'.5), or the dried mixture-treated substrate obtained in (b'.6) in a gas atmosphere, more preferably having a temperature in the range of from 350 to 600° C., more preferably in the range of from 400 to 500° C.;

wherein from (b.7) or (b'.7), the catalyst for the oxidation of HC and the selective catalytic reduction of NOx is obtained.

As to (b.1), it is preferred that it comprises, more preferably consists of,
- (b.1.1) impregnating the source of a platinum group metal component onto the first oxidic material, obtaining an impregnated first oxidic material;
- (b.1.2) more preferably calcining the impregnated first oxidic material obtained in (b.1.1) in a gas atmosphere, more preferably having a temperature in the range of from 500 to 650° C.;
- (b.1.3) forming a mixture with water and the impregnated oxidic material obtained in (b.1.1), more preferably in (b.1.2);
- (b.1.4) more preferably setting the pH of the aqueous phase of the mixture obtained in (b.1.3) to a value ranging from 2 to 5, more preferably from 3.25 to 4.25, by optionally adding an acid, more preferably an organic acid.

As to (b.2), it is preferred that it comprises, more preferably consists of,
- (b.2.1) forming a mixture with water and the particles of the mixed oxide;
- (b.2.2) more preferably adding an organic dispersant to the mixture obtained in (b.2.1);
- (b.2.3) admixing the second oxidic material into the mixture obtained in (b.2.1), more preferably in (b.2.2);
- (b.2.4) more preferably setting the pH of the aqueous phase of the mixture obtained in (b.2.3) to a value ranging from 6 to 8, more preferably from 6.5 to 7.5, by optionally adding a base, more preferably an organic base.

As to (b), it is alternatively preferred that it comprises, more preferably consists of,
- (b.1') impregnating the source of a platinum group metal component onto the first oxidic material, obtaining an impregnated first oxidic material, more preferably calcining the impregnated oxidic material;
- (b.2') forming a first mixture with water, the impregnated oxidic material obtained in (b.1') and more preferably a source of an oxidic component;
- (b.3') forming a second mixture with water, the particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and the second oxidic material, obtaining the second mixture;

(b.4') more preferably adding an oxidic binder to the mixture obtained in (b.3');

(b.5') disposing the second mixture obtained in (b.3'), more preferably in (b.4'), on the surface of the internal walls of the substrate provided in (a), wherein the surface defines the interface between the passages and the internal walls of the substrate, more preferably over x % of the substrate axial length, wherein x ranges from 90 to 100, more preferably from 95 to 100, more preferably from 98 to 100, more preferably from 99 to 100;

(b.6') optionally drying the mixture disposed on the substrate obtained in (b.5'), obtaining a dried mixture-treated substrate;

(b.7') calcining the second mixture disposed on the substrate obtained in (b.5'), more preferably the dried mixture-treated substrate obtained in (b.6'), in a gas atmosphere, more preferably having a temperature in the range of from 350 to 600° C., more preferably in the range of from 400 to 500° C., obtaining a substrate coated with a bottom coat; and optionally (B.5') disposing the mixture obtained in (b.3'), more preferably in (b.4'), on the surface of the coating disposed on the substrate as obtained in (b.7');

(B.6') optionally drying the mixture-treated substrate obtained in (B.5');

(B.7') calcining the mixture-treated substrate obtained in (B.5'), or the dried mixture-treated substrate obtained in (B.6') in a gas atmosphere, more preferably having a temperature in the range of from 350 to 600° C., more preferably in the range of from 400 to 500° C.;

wherein from (b.7') or (B.7'), the bottom coat is obtained;

(b.8') disposing the first mixture obtained in (b.2') on the bottom coat, more preferably over y % of the substrate axial length, wherein y ranges from 90 to 100, more preferably from 95 to 100, more preferably from 98 to 100, more preferably from 99 to 100;

(b.9') optionally drying the mixture disposed on the substrate obtained in (b.8'), obtaining a dried mixture-treated substrate;

(b.10') calcining the mixture disposed on the substrate obtained in (b.8'), more preferably the dried mixture-treated substrate obtained in (b.9'), in a gas atmosphere, more preferably having a temperature in the range of from 350 to 600° C., more preferably in the range of from 400 to 500° C.

As to (b.2'), it is preferred that it comprises, more preferably consists of, (b.2'.1) forming a first mixture with water, the impregnated oxidic material obtained in (b.1');

(b.2'.2) setting the pH of the aqueous phase of the mixture obtained in (b.2'.1) to a value ranging from 2 to 5, more preferably from 3.25 to 4.25, by optionally adding an acid, more preferably an organic acid;

(b.2'.3) more preferably adding a source of an oxidic component to the mixture obtained in (b.2'.2);

(b.2'.4) more preferably setting the pH of the aqueous phase of the mixture obtained in (b.2'.3) to a value ranging from 6 to 8, more preferably from 6.5 to 7.5, by optionally adding a base.

As to (b.3'), it is preferred that it comprises, more preferably consists of, (b.3'.1) forming a mixture with water, the particles of the mixed oxide;

(b.3'.2) more preferably adding an organic dispersant to the mixture obtained in (b.3'.1);

(b.3'.3) admixing the second oxidic material into the mixture obtained in (b.3'.1), more preferably in (b.3'.2);

(b.3'.4) more preferably setting the pH of the aqueous phase of the mixture obtained in (b.3'.3) to a value ranging from 6 to 8, preferably from 6.5 to 7.5, by optionally adding a base.

In the context of the present invention, it is preferred that disposing one or more mixtures according to one or more of (b), (b.5), (b'.5), (b.5'), (B.5') and (b.8'), more preferably according to (b), (b.5), (b'.5), (b.5'), (B.5') and (b.8'), is performed by spraying or immerging the substrate, more preferably immerging the substrate in said mixture.

It is preferred that, according to one or more of (b.6), (b'.6), (b.6') and (B.6'), more preferably according to (b.6), (b'.6), (b.6') and (B.6'), drying is performed in gas atmosphere having a temperature in the range of from 60 to 200° C., more preferably in the range of from 90 to 160° C.; wherein drying more preferably is performed in gas atmosphere for a duration in the range of from 10 to 240 minutes, more preferably in the range of from 15 to 80 minutes, more preferably in the range of from 20 to 60 minutes.

It is preferred that, according to one or more of (b), (b.7), (b'.7), (b.7'), (B.7') and (b.10'), more preferably according to (b), (b.7), (b'.7), (b.7'), (B.7') and (b.10'), calcining is performed in gas atmosphere having a temperature in the range of from 425 to 475° C.

It is preferred that, according to one or more of (b), (b.7), (b'.7), (b.7'), (B.7') and (b.10'), more preferably according to (b), (b.7), (b'.7), (b.7'), (B.7') and (b.10'), calcining is performed in gas atmosphere for a duration in the range of from 10 to 240 minutes, more preferably in the range of from 15 to 80 minutes, more preferably in the range of from 20 to 60 minutes.

It is preferred that the gas atmosphere comprises oxygen, wherein the gas atmosphere more preferably is air.

It is preferred that the platinum group metal component in (b) comprises one or more of palladium, platinum, rhodium and iridium, more preferably one or more of palladium, platinum and rhodium, more preferably one or more of palladium and rhodium, more preferably palladium. It is more preferred that the source of the platinum group metal component comprises a salt of a platinum group metal component, more preferably a nitrate of a platinum group metal.

It is preferred that the oxidic component in (b.2') is one or more of zirconia, silica, alumina and titania, more preferably one or more of zirconia and silica, more preferably zirconia.

It is preferred that the process according to the present invention consists of (a) and (b).

The present invention further relates to an aqueous suspension comprising a source of a platinum group metal component, particles of a first oxidic material, water, particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, a second oxidic material, and preferably an oxidic binder as defined in the foregoing. The components of the aqueous suspension preferably are as defined in the foregoing.

The present invention further relates to a catalyst for the oxidation of hydrocarbon and the selective catalytic reduction of nitrogen oxides, preferably the catalyst for the oxidation of hydrocarbon and the selective catalytic reduction of nitrogen oxides according to the present invention, obtainable or obtained by a process according to the present invention and as defined in the foregoing.

The present invention further relates to an exhaust gas treatment system for treating exhaust gas from an internal combustion engine, preferably from a diesel engine, the system comprising a catalyst according to the present invention and as defined in the foregoing, and one or more of an ammonia oxidation catalyst, a diesel oxidation catalyst, a selective catalytic reduction catalyst and a catalyzed particulate filter.

It is preferred that the catalyst according to the present invention is the first catalyst of the system. Thus, the catalyst according to the present invention preferably is a close-coupled catalyst. The system preferably comprises a first ammonia oxidation catalyst positioned downstream of the catalyst according to the present invention, and a catalyzed soot filter positioned downstream of the first ammonia oxidation catalyst. It is more preferred that the system further comprises a selective catalytic reduction catalyst which is positioned downstream of the catalyzed soot filter. It is more preferred that the system further comprises a second ammonia oxidation catalyst which is positioned downstream of the selective catalytic reduction catalyst. Further, the system of the present invention optionally further comprises a diesel oxidation catalyst which is positioned downstream of the first ammonia oxidation catalyst and upstream of the catalyzed soot filter.

The present invention further relates to a use of the catalyst for the oxidation of hydrocarbon and for the selective catalytic reduction of nitrogen oxides (NOx) according to the present invention for the simultaneous selective catalytic reduction of NOx and the oxidation of hydrocarbon.

The present invention further relates to a method for the simultaneously oxidation of hydrocarbon and the selective catalytic reduction of nitrogen oxides, comprising
(1) providing a gas stream comprising one or more of NOx and hydrocarbon;
(2) contacting the gas stream provided in (1) with the catalyst for the oxidation of hydrocarbon and for the selective catalytic reduction of nitrogen oxides (NOx) according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. A catalyst for the oxidation of hydrocarbon and the selective catalytic reduction of nitrogen oxides, the catalyst comprising
   (i) a substrate comprising an inlet end, an outlet end, a substrate axial length extending from the inlet end to the outlet end and a plurality of passages defined by internal walls of the substrate extending therethrough;
   (ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and one or more of iron, erbium, bismuth, cerium, europium, gadolinium, holmium, lanthanum, lutetium, neo-dymium, praseodymium, promethium, samarium, scandium, terbium, thulium, ytterbium, yttrium, molybdenum, tungsten, manganese, cobalt, nickel, copper, aluminum and antimony, wherein the mixed oxide is supported on a second oxidic material.

2. The catalyst of embodiment 1, wherein the substrate (i) is a flow-through substrate or a wall-flow filter substrate, preferably a flow-through substrate.

3. The catalyst of embodiment 1 or 2, wherein the substrate (i) comprises, preferably consists of, a ceramic substance, wherein the ceramic substance preferably comprises, more preferably consists of, one or more of an alumina, a silica, a silicate, an aluminosilicate, more preferably a cordierite or a mullite, an aluminotitanate, a silicon carbide, a zirconia, a magnesia, more preferably a spinel, and a titania, more preferably one or more of a silicon carbide and a cordierite, more preferably a cordierite.

4. The catalyst of any one of embodiments 1 to 3, wherein the platinum group metal component comprises, preferably consists of, one or more of palladium, platinum, rhodium and iridium, preferably one or more of palladium, platinum and rhodium, more preferably one or more of palladium and rhodium, wherein the platinum group metal component preferably comprises, more preferably consists of, palladium.

5. The catalyst of any one of embodiments 1 to 4, wherein the coating comprises the platinum group metal component at a loading, calculated as elemental platinum group metal, in the range of from 2 to 70 g/ft$^3$, preferably in the range of from 5 to 50 g/ft$^3$, more preferably in the range of from 10 to 30 g/ft$^3$, more preferably in the range of from 12 to 20 g/ft$^3$.

6. The catalyst of any one of embodiments 1 to 5, wherein the first oxidic material comprises one or more oxides, preferably one or more of a zirconium oxide, an aluminum oxide, a silicon oxide and a titanium oxide, more preferably one or more of a zirconium oxide, an aluminum oxide, and a silicon oxide, more preferably a zirconium oxide or an aluminum oxide.

7. The catalyst of embodiment 6, wherein from 75 to 100 weight-%, preferably from 80 to 98 weight-%, more preferably from 85 to 95 weight-%, of the first oxidic material consist of zirconia.

8. The catalyst of embodiment 7, wherein the first oxidic material further comprises one or more of a hafnium oxide and a lanthanum oxide, preferably a hafnium oxide and a lanthanum oxide;
   wherein more preferably from 98 to 100 weight-%, more preferably from 99 to 100 weight-%, more preferably from 99.5 to 100 weight-%, more preferably from 99.9 to 100 weight-%, of the first oxidic material consist of zirconia, an hafnium oxide and a lanthanum oxide; wherein more preferably from 80 to 98 weight-%, more preferably from 85 to 95 weight-%, of the first oxidic material consist of zirconia, from 1.5 to 15 weight-%, more preferably from 4 to 12 weight-%, of the first oxidic material consist of a lanthanum oxide and from 0.5 to 5 weight-%, more preferably from 1 to 3 weight-%, of the first oxidic material consist of a hafnium oxide.

9. The catalyst of embodiment 6, wherein from 70 to 100 weight-%, preferably from 72 to 95 weight-%, more preferably from 75 to 85 weight-%, of the first oxidic material consist of alumina.

10. The catalyst of embodiment 9, wherein the first oxidic material further comprises one or more of a lanthanum oxide and a zirconium oxide, preferably a lanthanum oxide and a zirconium oxide;
   wherein more preferably from 98 to 100 weight-%, more preferably from 99 to 100 weight-%, more preferably from 99.5 to 100 weight-%, more preferably from 99.9 to 100 weight-%, of the first oxidic material consist of alumina, a zirconium oxide and a lanthanum oxide; wherein more preferably from 72 to 95 weight-%, more preferably from 75 to 85 weight-%, of the first oxidic material consist of alumina, from 4 to 24 weight-%, more preferably from 14 to 22 weight-%, of the first oxidic material consist of a zirconium oxide and from 1 to 4 weight-%, more preferably from 1 to 3 weight-%, of the first oxidic material consist of a lanthanum oxide.

11. The catalyst of any one of embodiments 1 to 10, wherein the coating comprises the first oxidic material at a loading in the range of from 0.25 to 1 g/in$^3$, preferably in the range of from 0.30 to 0.80 g/in$^3$, more preferably in the range of from 0.40 to 0.70 g/in$^3$.

12. The catalyst of any one of embodiments 1 to 11, wherein the mixed oxide is a mixed oxide of vanadium and one or more of iron, erbium, bismuth, aluminum and antimony, preferably one or more of iron, erbium, bismuth and antimony, more preferably one or more of iron and antimony.

13. The catalyst of embodiment 12, wherein the mixed oxide is a mixed oxide of vanadium and iron.

14. The catalyst of any one of embodiments 1 to 13, wherein in the mixed oxide, the molar ratio of the one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, to the vanadium, X:V, is in the range of from 1:1.5 to 1.5:1, preferably in the range of from 1:1.2 to 1.2:1, more preferably in the range of from 1:1.1 to 1.1:1.

15. The catalyst of any one of embodiments 1 to 14, wherein the second oxidic material supporting the mixed oxide comprises one or more oxides, preferably one or more of a titanium oxide, an aluminum oxide, a silicon oxide and a zirconium oxide, more preferably one or more of a titanium oxide and a silicon oxide, more preferably a titanium oxide, more preferably titania.

16. The catalyst of embodiment 15, wherein the second oxidic material comprises a titanium oxide, preferably titania, and one or more of a tungsten oxide, a silicon oxide, an antimony oxide and a cerium oxide, preferably one or more of a tungsten oxide and silicon oxide, more preferably a tungsten oxide.

17. The catalyst of embodiment 16, wherein the tungsten oxide is impregnated on the titania.

18. The catalyst of any one of embodiments 15 to 17, wherein from 75 to 100 weight-%, preferably from 80 to 99 weight-%, more preferably from 85 to 95 weight-% of the second oxidic material consist of titania.

19. The catalyst of any one of embodiments 15 to 18, wherein from 98 to 100 weight-%, preferably from 99 to 100 weight-%, more preferably from 99.5 to 100 weight-%, more preferably from 99.9 to 100 weight-% of the second oxidic material consist of titania and tungsten oxide, wherein more preferably from 80 to 99 weight-%, more preferably 85 to 95 weight-% of the second oxidic material consist of titania and from 1 to 20 weight-%, more preferably from 5 to 15 weight-% of the second oxidic material consist of tungsten oxide.

20. The catalyst of any one of embodiments 15 to 19, wherein from 50 to 90 weight-%, preferably from 65 to 85 weight-%, more preferably from 70 to 80 weight-%, of the coating consist of the second oxidic material.

21. The catalyst of any one of embodiments 1 to 20, wherein the amount of the mixed oxide in the coating is in the range of from 3 to 25 weight-%, preferably in the range of from 5 to 18 weight-%, more preferably in the range of from 7 to 16 weight-%, more preferably in the range of from 9 to 15 weight-%, more preferably in the range of from 10 to 14.5 weight-%, based on the weight of the second oxidic material.

22. The catalyst of any one of embodiments 1 to 21, wherein the coating further comprises an oxidic binder, wherein the oxidic binder preferably comprises one or more of zirconia, alumina, titania, silica and a mixed oxide comprising two or more of Zr, Al, Ti and Si, wherein the oxidic binder more preferably comprises one or more of alumina and silica, more preferably silica.

23. The catalyst of embodiment 22, wherein, in the catalyst, the coating comprises from 1 to weight-%, preferably from 2 to 8 weight-%, more preferably from 3 to 6 weight-% of the oxidic binder based on the weight of the second oxidic material.

24. The catalyst of any one of embodiments 1 to 23, wherein the catalyst comprises the coating at a loading in the range of from 2.5 to 10 g/in$^3$, preferably in the range of from 3 to 8 g/in$^3$, more preferably in the range of from 3.5 to 6 g/in$^3$.

25. The catalyst of any one of embodiments 1 to 24, wherein the coating is disposed on the surface of the internal walls of the substrate over z % of the substrate axial length, wherein z ranges from 90 to 100, preferably from 95 to 100, more preferably from 98 to 100, more preferably from 99 to 100.

26. The catalyst of any one of embodiments 1 to 25, wherein the coating according to (ii) comprises, preferably consists of:
   (ii.1) a bottom coat comprising the mixed oxide supported on the second oxidic material;
   (ii.2) a top coat comprising the platinum group metal component supported on the first oxidic material;
   wherein the bottom coat is disposed on the surface of the internal walls of the substrate over x % of the substrate axial length, wherein x ranges from 90 to 100, preferably from 95 to 100, more preferably from 98 to 100, more preferably from 99 to 100;
   wherein the top coat is disposed on the bottom coat over y % of the substrate axial length, wherein y ranges from 90 to 100, preferably from 95 to 100, more preferably from 98 to 100, more preferably from 99 to 100.
27. The catalyst of embodiment 26, wherein the second oxidic material supporting the mixed oxide comprised in the bottom coat (ii.1) is as defined in any one of embodiments 15 to 19.
28. The catalyst of embodiment 26 or 27, wherein the bottom coat according to (ii.1) further comprises the oxidic binder as defined in embodiment 22 or 23.
29. The catalyst of any one of embodiments 26 to 28, wherein from 98 to 100 weight-%, preferably from 99 to 100 weight-%, more preferably from 99.5 to 100 weight-%, more preferably from 99.9 to 100 weight-%, of the bottom coat according to (ii.1) consist of the mixed oxide, the second oxidic material, and more preferably an oxidic binder as defined in embodiment 28.
30. The catalyst of any one of embodiments 26 to 29, wherein from 0 to 0.001 weight-%, preferably from 0 to 0.0001 weight-%, more preferably from 0 to 0.00001 weight-%, more preferably from 0 to 0.000001 weight-%, of the bottom coat according to (ii.1) consist of palladium, preferably of palladium and platinum, more preferably of a platinum group metal component.
31. The catalyst of any one of embodiments 26 to 30, wherein the catalyst comprises the bottom coat according to (ii.1) at a loading in the range of from 2.2 to 7 g/in$^3$, preferably in the range of from 2.6 to 6 g/in$^3$, more preferably in the range of from 3.1 to 5 g/in$^3$.
32. The catalyst of any one of embodiments 26 to 31, wherein the top coat according to (ii.2) further comprises an oxidic component, wherein the oxidic component preferably comprises one or more of zirconia, alumina, titania, silica and a mixed oxide comprising two or more of Zr, Al, Ti and Si, wherein the oxidic component more preferably comprises one or more of zirconia and alumina, more preferably zirconia.
33. The catalyst of embodiment 32, wherein the top coat according to (ii.2) comprises the oxidic component in an amount in the range of from 2 to 20 weight-%, preferably in the range of from 5 to 15 weight-%, more preferably in the range of from 7 to 13 weight-%, based on the weight of the first oxidic material.
34. The catalyst of any one of embodiments 26 to 33, wherein from 98 to 100 weight-%, preferably from 99 to 100 weight-%, more preferably from 99.5 to 100 weight-%, more preferably from 99.9 to 100 weight-%, of the top coat according to (ii.2) consist of the platinum group metal component, preferably palladium, the first oxidic material, and preferably an oxidic component as defined in embodiment 32 or 33.
35. The catalyst of any one of embodiments 26 to 34, wherein from 0 to 0.1 weight-%, preferably from 0 to 0.01 weight-%, more preferably from 0 to 0.001 weight-%, more preferably from 0 to 0.0001 weight-%, of the top coat according to (ii.2) consist of vanadium.
36. The catalyst of any one of embodiments 26 to 35, wherein the catalyst comprises the top coat according to (ii.2) at a loading in the range of from 0.3 to 3 g/in$^3$, preferably in the range of from 0.4 to 2 g/in$^3$, more preferably in the range of from 0.4 to 1 g/in$^3$.
37. The catalyst of any one of embodiments 26 to 36, wherein x=y.
38. The catalyst of any one of embodiments 1 to 25, wherein the coating according to (ii) consists of one coat, wherein the coat is disposed on the surface of the internal walls of the substrate over z % of the substrate axial length, wherein z ranges from 90 to 100, preferably from 95 to 100, more preferably from 98 to 100, more preferably from 99 to 100.
39. The catalyst of any one of embodiments 1 to 38, wherein from 98 to 100 weight-%, preferably from 99 to 100 weight-%, more preferably from 99.5 to 100 weight-%, more preferably from 99.9 to 100 weight-%, of the coating consist of the platinum group metal component supported on the first oxidic material, the mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, supported on the second oxidic material, and more preferably an oxidic binder as defined in embodiment 22 or 23, and optionally an oxidic component as defined in embodiment 32 or 33.
40. The catalyst of any one of embodiments 1 to 39, wherein from 0 to 0.1 weight-%, preferably from 0 to 0.01 weight-%, more preferably from 0 to 0.001 weight-%, more preferably from 0 to 0.0001 weight-%, of the coating consist of a zeolitic material, preferably of a molecular sieve. 41. The catalyst of any one of embodiments 1 to 40, wherein the catalyst consists of the substrate (i) and the coating (ii). 42. A process for preparing a catalyst for the oxidation of hydrocarbon and the selective catalytic reduction of nitrogen oxides, preferably the catalyst according to any one of embodiments 1 to 41, comprising
(a) providing a substrate comprising an inlet end, an outlet end, a substrate axial length extending from the inlet end to the outlet end and a plurality of passages defined by internal walls of the substrate extending therethrough;
(b) providing one or more mixtures comprising a source of a platinum group metal component, particles of a first oxidic material, water, particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, a second oxidic material and preferably an oxidic binder as defined in embodiment 22 or 23,
disposing said one or more mixtures over z % of the substrate axial length, wherein z ranges from 90 to 100,
calcining the one or more mixtures disposed on the substrate.
43. The process of embodiment 42, wherein (b) comprises, preferably consists of,
(b.1) impregnating the source of a platinum group metal component onto the first oxidic material, obtaining an impregnated first oxidic material, preferably calcining the impregnated oxidic material, and forming a mixture with water and the impregnated oxidic material;
(b.2) forming a mixture with water, the particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and the second oxidic material;

(b.3) preferably adding an oxidic binder to the mixture obtained in (b.2);

(b.4) admixing the impregnated first oxidic material mixture obtained in (b.1), preferably the mixture with the calcined impregnated oxidic material obtained in (b.1), with the mixture obtained in (b.2), preferably in (b.3), preferably setting the pH of the aqueous phase of the obtained mixture to a value ranging from 6 to 8, preferably from 6.5 to 7.5, by optionally adding a base, preferably an organic base, obtaining a final mixture;

(b.5) disposing the final mixture obtained in (b.4) on the surface of the internal walls of the substrate provided in (a), wherein the surface defines the interface between the passages and the internal walls of the substrate, preferably over z % of the substrate axial length, wherein z ranges from 95 to 10, more preferably from 98 to 100, more preferably from 99 to 100;

(b.6) optionally drying the mixture disposed on the substrate obtained in (b.5), obtaining a dried mixture-treated substrate;

(b.7) calcining the mixture disposed on the substrate obtained in (b.5), preferably the dried mixture-treated substrate obtained in (b.6), in a gas atmosphere, preferably having a temperature in the range of from 350 to 600° C., more preferably in the range of from 400 to 500° C., and optionally (b'.5) disposing the final mixture obtained in (b.4) on the surface of the coating disposed on the substrate as obtained in (b.7);

(b'.6) optionally drying the mixture-treated substrate obtained in (b'.5);

(b'.7) calcining the mixture-treated substrate obtained in (b'.5), or the dried mixture-treated substrate obtained in (b'.6) in a gas atmosphere, preferably having a temperature in the range of from 350 to 600° C., more preferably in the range of from 400 to 500° C.;

wherein from (b.7) or (b'.7), the catalyst for the oxidation of HC and the selective catalytic reduction of NOx is obtained.

44. The process of embodiment 43, wherein (b.1) comprises (b.1.1) impregnating the source of a platinum group metal component onto the first oxidic material, obtaining an impregnated first oxidic material;

(b.1.2) preferably calcining the impregnated first oxidic material obtained in (b.1.1) in a gas atmosphere, more preferably having a temperature in the range of from 500 to 650° C.;

(b.1.3) forming a mixture with water and the impregnated oxidic material obtained in (b.1.1), preferably in (b.1.2);

(b.1.4) preferably setting the pH of the aqueous phase of the mixture obtained in (b.1.3) to a value ranging from 2 to 5, preferably from 3.25 to 4.25, by optionally adding an acid, preferably an organic acid.

45. The process of embodiment 43 or 44, wherein (b.2) comprises (b.2.1) forming a mixture with water and the particles of the mixed oxide;

(b.2.2) preferably adding an organic dispersant to the mixture obtained in (b.2.1);

(b.2.3) admixing the second oxidic material into the mixture obtained in (b.2.1), preferably in (b.2.2);

(b.2.4) preferably setting the pH of the aqueous phase of the mixture obtained in (b.2.3) to a value ranging from 6 to 8, preferably from 6.5 to 7.5, by optionally adding a base, preferably an organic base.

46. The process of embodiment 42, wherein (b) comprises, preferably consists of, (b.1') impregnating the source of a platinum group metal component onto the first oxidic material, obtaining an impregnated first oxidic material, preferably calcining the impregnated oxidic material;

(b.2') forming a first mixture with water, the impregnated first oxidic material obtained in (b.1') and preferably a source of an oxidic component;

(b.3') forming a second mixture with water, the particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, and the second oxidic material, obtaining the second mixture;

(b.4') preferably adding an oxidic binder to the mixture obtained in (b.3');

(b.5') disposing the second mixture obtained in (b.3'), preferably in (b.4'), on the surface of the internal walls of the substrate provided in (a), wherein the surface defines the interface between the passages and the internal walls of the substrate, preferably over x % of the substrate axial length, wherein x ranges from 90 to 100, more preferably from 95 to 100, more preferably from 98 to 100, more preferably from 99 to 100;

(b.6') optionally drying the mixture disposed on the substrate obtained in (b.5'), obtaining a dried mixture-treated substrate;

(b.7') calcining the second mixture disposed on the substrate obtained in (b.5'), preferably the dried mixture-treated substrate obtained in (b.6'), in a gas atmosphere, preferably having a temperature in the range of from 350 to 600° C., more preferably in the range of from 400 to 500° C., obtaining a substrate coated with a bottom coat;

and optionally (B.5') disposing the mixture obtained in (b.3'), preferably in (b.4'), on the surface of the coating disposed on the substrate as obtained in (b.7');

(B.6') optionally drying the mixture-treated substrate obtained in (B.5');

(B.7') calcining the mixture-treated substrate obtained in (B.5'), or the dried mixture-treated substrate obtained in (B.6') in a gas atmosphere, preferably having a temperature in the range of from 350 to 600° C., more preferably in the range of from 400 to 500° C.;

wherein from (b.7') or (B.7'), the bottom coat is obtained;

(b.8') disposing the first mixture obtained in (b.2') on the bottom coat, preferably over y % of the substrate axial length, wherein y ranges from 90 to 100, more preferably from 95 to 100, more preferably from 98 to 100, more preferably from 99 to 100;

(b.9') optionally drying the mixture disposed on the substrate obtained in (b.8'), obtaining a dried mixture-treated substrate;

(b.10') calcining the mixture disposed on the substrate obtained in (b.8'), preferably the dried mixture-treated substrate obtained in (b.9'), in a gas atmosphere, preferably having a temperature in the range of from 350 to 600° C., more preferably in the range of from 400 to 500° C.

47. The process of embodiment 45, wherein (b.2') comprises
   (b.2'.1) forming a first mixture with water, the impregnated first oxidic material obtained in (b.1');
   (b.2'.2) setting the pH of the aqueous phase of the mixture obtained in (b.2'.1) to a value ranging from 2 to 5, preferably from 3.25 to 4.25, by optionally adding an acid, preferably an organic acid;
   (b.2'.3) preferably adding a source of an oxidic component to the mixture obtained in (b.2'.2);
   (b.2'.4) preferably setting the pH of the aqueous phase of the mixture obtained in (b.2'.3) to a value ranging from 6 to 8, preferably from 6.5 to 7.5, by optionally adding a base.

48. The process of embodiment 46 or 47, wherein (b.3') comprises
   (b.3'.1) forming a mixture with water, the particles of the mixed oxide;
   (b.3'.2) preferably adding an organic dispersant to the mixture obtained in (b.3'.1);
   (b.3'.3) admixing the second oxidic material into the mixture obtained in (b.3'.1), preferably in (b.3'.2);
   (b.3'.4) preferably setting the pH of the aqueous phase of the mixture obtained in (b.3'.3) to a value ranging from 6 to 8, preferably from 6.5 to 7.5, by optionally adding a base.

49. The process of any one of embodiments 42 to 48, wherein disposing one or more mixtures according to (b), (b.5), (b'.5), (b.5'), (B.5') and/or (b.8'), preferably according to (b), (b.5), (b'.5), (b.5'), (B.5') and (b.8'), is performed by spraying or immerging the substrate, preferably immerging the substrate in said mixture.

50. The process of any one of embodiments 43 to 48, wherein, according to (b.6), (b'.6), (b.6') and/or (B.6'), preferably according to (b.6), (b'.6), (b.6') and (B.6'), drying is performed in gas atmosphere having a temperature in the range of from 60 to 200° C., preferably in the range of from 90 to 160° C.;
   wherein drying preferably is performed in gas atmosphere for a duration in the range of from 10 to 240 minutes, more preferably in the range of from 15 to 80 minutes, more preferably in the range of from 20 to 60 minutes.

51. The process of any one of embodiments 42 to 50, wherein, according to (b), (b.7), (b'.7), (b.7'), (B.7') and/or (b.10'), preferably according to (b), (b.7), (b'.7), (b.7'), (B.7') and (b.10'), calcining is performed in gas atmosphere having a temperature in the range of from 425 to 475° C.

52. The process of any one of embodiments 42 to 51, wherein, according to (b), (b.7), (b'.7), (b.7'), (B.7') and/or (b.10'), preferably according to (b), (b.7), (b'.7), (b.7'), (B.7') and (b.10'), calcining is performed in gas atmosphere for a duration in the range of from 10 to 240 minutes, preferably in the range of from 15 to 80 minutes, more preferably in the range of from 20 to 60 minutes.

53. The process of any one of embodiments 42 to 52, wherein the gas atmosphere comprises oxygen, wherein the gas atmosphere more preferably is air.

54. The process of any one of embodiments 42 to 53, wherein the platinum group metal component in (b) comprises one or more of palladium, platinum, rhodium and iridium, preferably one or more of palladium, platinum and rhodium, more preferably one or more of palladium and rhodium, more preferably palladium, wherein the source of the platinum group metal component more preferably comprises a salt of a platinum group metal component, more preferably a nitrate of a platinum group metal.

55. The process of embodiment 45 or 46, wherein the oxidic component in (b.2') is one or more of zirconia, silica, alumina and titania, preferably one or more of zirconia and silica, more preferably zirconia.

56. The process of any one of embodiments 42 to 55, consisting of (a) and (b).

57. An aqueous suspension comprising a source of a platinum group metal component, particles of a first oxidic material, water, particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, a second oxidic material, and preferably an oxidic binder as defined in embodiment 22 or 23.

58. A catalyst for the oxidation of hydrocarbon and the selective catalytic reduction of nitrogen oxides, preferably the catalyst for the oxidation of hydrocarbon and the selective catalytic reduction of nitrogen oxides according to any one of embodiments 1 to 41, obtainable or obtained by a process according to any one of embodiments 42 to 56.

59. An exhaust gas treatment system for treating exhaust gas from an internal combustion engine, preferably from a diesel engine, the system comprising a catalyst according to any one of embodiments 1 to 41 and 57, and one or more of an ammonia oxidation catalyst, a diesel oxidation catalyst, a selective catalytic reduction catalyst and a catalyzed particulate filter.

60. The system of embodiment 59, wherein the catalyst according to any one of embodiments 1 to 41 and 58 is the first catalyst of the system, wherein the system comprises a first ammonia oxidation catalyst positioned downstream of the catalyst according to any one of embodiments 1 to 41 and 58, a catalyzed soot filter positioned downstream of the first ammonia oxidation catalyst, and preferably upstream of a selective catalytic reduction catalyst, wherein the selective catalytic reduction catalyst comprised in the system preferably is positioned upstream of a second ammonia oxidation catalyst;
   wherein optionally a diesel oxidation catalyst is positioned downstream of the first ammonia oxidation catalyst and upstream of the catalyzed soot filter.

61. Use of the catalyst for the oxidation of hydrocarbon and for the selective catalytic reduction of nitrogen oxides (NOx) according to any one of embodiments 1 to 41 and 58 for the simultaneous selective catalytic reduction of NOx and the oxidation of hydrocarbon.

62. A method for the simultaneously oxidation of hydrocarbon and the selective catalytic reduction of nitrogen oxides, comprising
(1) providing a gas stream comprising one or more of NOx and hydrocarbon;
(2) contacting the gas stream provided in (1) with the catalyst for the oxidation of hydrocarbon and for the selective catalytic reduction of nitrogen oxides (NOx) according to any one of embodiments 1 to 41 and 58.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "consists of" with regard to the weight-% of one or more components indicates the weight-% amount of said component(s) based on 100 weight-% of the entity in question. For example, the wording "wherein from 0 to 0.001 weight-% of the bottom coat consists of palladium" indicates that among the 100 weight-% of the components of which said coat consists of, 0 to 0.001 weight-% is palladium.

Finally, in the context of the present invention, the term "coating" designates a covering which is deposited on the surface of the internal walls of a substrate, said coating may comprise a single coat or several coats, preferably a single coat or two coats (two coats: a top coat and a bottom coat). Further, in the context of the present invention, it should be understood that when preparing a coat or a coating, the coating step might be repeated twice in order to attain the targeted loading such that a "coat" or a "coating" as disclosed in the present invention may comprise one or more layers having the same chemical composition/catalytic activity which would be distinguishable only with SEM analysis.

The present invention is further illustrated by the following Reference Examples, Comparative Examples, and Examples.

EXAMPLES

Reference Example 1 Determination of Dv10, Dv50 and Dv90 Values

The particle size distributions were determined by a static light scattering method using Sympatec HELOS equipment, wherein the optical concentration of the sample was in the range of from 5 to 10%.

Reference Example 2 Measurement of the BET Specific Surface Area

The BET specific surface area was determined according to DIN 66131 or DIN ISO 9277 using liquid nitrogen.

Reference Example 3 General Coating Method

In order to coat a flow-through substrate with one or more coats, the flow-through substrate was immersed vertically in a given mixture for a specific length of the substrate (usually about 1 inch), to fill the substrate with a charge of the mixture. In this manner, the mixture contacted the walls of the substrate. The substrate was left in the mixture for a specific period of time, usually for 1-10 seconds. Vacuum was applied to draw the mixture into the substrate. The substrate was then removed from the mixture. The substrate was rotated about its axis such that the immersed side now points up and a high pressure of air forces the charged mixture through the substrate.

Example 1 Preparation of a Multifunctional Mixed Catalyst (with a Pd/Zirconia Component and a V-Containing Mixed Oxide)

An incipient wetness impregnation of Pd onto a zirconium based oxidic support (88 weight-% of $ZrO_2$ with 10 weight-% $La_2O_3$ and 2 weight-% $HfO_2$, having a BET specific surface area of 67 $m^2$/g, a Dv50 of 3 micrometers and a Dv90 of 16 micrometers). Firstly, the available pore volume of the oxidic support was determined and, based on this value, a diluted palladium salt solution with a volume equal to the available pore volume was made. The diluted solution was then added dropwise to the Zr-based oxidic support over 30 minutes under constant stirring resulting in a moist material. The resulting material was then calcined in an oven at 590° C. and allowed to cool. After calcination, the resulting powder was mixed with distilled water to form an aqueous mixture with 40% solids and the pH was adjusted to 3.75 using an organic acid. At this point, the slurry was milled until the particles of the mixture had a Dv90 of 10 micrometers.

Separately, a vanadium mixture was made by mixing iron vanadate ($FeVO_4$ having a molar ratio of Fe:V of 1:1, a Dv50 of about 2 micrometers and a Dv90 of about 11 micrometers) powder with distilled water. The solid content of the obtained mixture was 10 weight-% based on the weight of the obtained mixture. The amount of iron vanadate used was calculated such that the vanadium (from the iron vanadate), calculated as $V_2O_5$, was present at a loading of 5% of the final loading of the coating in the catalyst after calcination (the loading of $FeVO_4$, calculated as $FeVO_4$, was 10.48% of the final loading of the coating in the catalyst after calcination). To this mixture an acrylic based dispersant (5 weight-% based on the final coating loading) was added and afterwards a tungsten-doped titania oxide (about 90 weight-% $TiO_2$ doped with 10 weight-% $WO_3$, a BET specific surface area of 90 m²/g, a Dv10 of 0.5 micrometer, a Dv50 of 1.2 micrometer and a Dv90 of 3.7 micrometers), such that the final loading of titania+WO₃ in the catalyst after calcination was of 3.35 g/in³. The pH of the said mixture was then set to 7 with the addition of a base. Afterwards, an aqueous colloidal silica binder was added, such that the final SiO₂ loading after calcination was 0.168 g/in³. The final mixture solid content was 43 weight-%.

At this point, the Pd-impregnated ZrO₂ mixture was mixed into the FeVO₄/TiO₂ mixture and the pH was again adjusted to 7. The final mixture was ready for disposal on a honeycomb flow-through monolith cordierite substrate (diameter: 26.67 cm (10.5 inches)×length: 15.24 cm (6 inches) cylindrically shaped substrate with 400/(2.54)² cells per square centimeter and 0.10 millimeter (4 mil) wall thickness). The substrate was coated with the final mixture according to the coating method defined in Reference Example 3 herein. To achieve the targeted washcoat loading of 4.5 g/in³, the substrate was coated twice along its entire length, once from the inlet end of the substrate and once from the outlet end of the substrate, with a drying and calcination steps after each coating step. To dry a coated substrate, the substrate was placed in an oven at 90° C. for about 30 minutes. After drying, the coated substrate was calcined for 30 minutes at 590° C. The final loading of the coating in the catalyst after calcination was of 4.5 g/in³, including 3.35 g/in³ of titania+WO₃, 0.47 g/in³ of FeVO₄ (including 0.225 g/in³ of vanadium calculated as V₂O₅), 0.5 g/in³ of zirconia+HfO₂+La₂O₃, 0.167 g/in³ of silica and a Pd loading of 15 g/ft³.

Example 2.1 Preparation of a Multifunctional Layered Catalyst (with a Pd/Alumina and a V Mixed Oxide)

Bottom Coating:

An iron vanadate (FeVO₄ having a molar ratio of Fe:V of 1:1) powder was mixed with distilled water. The solid content of the obtained mixture was 10 weight-% based on the weight of the obtained mixture. The amount of iron vanadate used was calculated such that the vanadium (from the iron vanadate), calculated as V₂O₅, was present at a loading of 5% of the final loading of the coating in the catalyst after calcination (the loading of FeVO₄, calculated as FeVO₄, was 10.48% of the final loading of the coating in the catalyst after calcination). To this mixture an acrylic based dispersant was added and afterwards a tungsten-doped titania oxide (about 90 weight-% TiO₂ doped with 10 weight-% WO₃, a BET specific surface area of 90 m²/g, a Dv10 of 0.5 micrometer, a Dv50 of 1.2 micrometers and a Dv90 of 3.7 micrometers), such that the final loading of titania+WO₃ in the catalyst after calcination was of 3.41 g/in³. The pH of the obtained mixture was set to 7. Afterwards, an aqueous colloidal silica binder, such that the final SiO₂ loading in the catalyst after calcination was 0.171 g/in³, along with additional distilled water to obtain a final mixture solid content of 43 weight-% based on the weight of said mixture. A honeycomb flow-through monolith cordierite substrate (diameter: 26.67 cm (10.5 inches)×length: 15.24 cm (6 inches) cylindrically shaped substrate with 400/(2.54)² cells per square centimeter and 0.10 millimeter (4 mil) wall thickness) was coated with the final mixture according to the coating method defined in Reference Example 3 herein. To achieve the targeted washcoat loading of 4 g/in³, the substrate was coated twice along its entire length, once from the inlet end of the substrate and once from the outlet end of the substrate, with a drying and calcination steps after each coating step. The coating, drying, and calcination procedures are identical to those of Example 1. The final loading of the bottom coating in the catalyst after calcination was 4 g/in³, including 3.41 g/in³ of titania+WO₃, 0.419 g/in³ of FeVO₄ (including 0.2 g/in³ of vanadium calculated as V₂O₅) and 0.171 g/in³ of silica.

Top Coating:

An incipient wetness impregnation of Pd onto an alumina based oxidic support (gamma and delta alumina doped with 20% ZrO₂ and 3% La₂O₃, a BET specific surface area of 145 m²/g, a Dv50 of 32 micrometers and a Dv90 of 62.5 micrometers). Firstly, the available pore volume of the given oxidic support was determined and, based on this value, a diluted palladium salt solution with a volume equal to the available pore volume was made. The diluted solution was then added dropwise to the Al-based oxidic support over 30 minutes under constant stirring resulting in a moist material. The resulting material was then calcined in an oven at 590° C. and allowed to cool. After calcination, the resulting powder was mixed with distilled water to form a mixture, and the pH of the aqueous phase of the mixture was set to 3.75 using an organic acid. At this point, the slurry was milled until the particles of the mixture had a Dv90 of 10 micrometers.

After milling, a soluble zirconium binder was added to the mixture, calculated such that it represented 11% of the Al-based oxidic support. The obtained final mixture had a solid content de-creased to 38 weight-% based on the weight of said final mixture. At this point, the mixture was ready for disposal over the substrate already coated with the bottom coating. The substrate coated with the bottom coating was coated once with said final mixture over the entire length of the substrate, according to the coating method as defined in Reference Example 3 herein. Drying conditions remained the same as for Example 1. However, after drying, the coated substrate was calcined for 30 minutes at 450° C. The final loading of the top coating in the catalyst after calcination was 0.5 g/in³, including 0.44 g/in³ of Al-based oxidic support, 0.056 g/in³ of zirconia and a Pd loading of 15 g/ft³.

Example 2.2 Preparation of a Multifunctional Layered Catalyst (with a Pd/Zirconia and a V Mixed Oxide)

Bottom coating: The bottom coating of Example 2.2 was prepared as the bottom coating of Example 2.1. Thus, the final loading of the bottom coating in the catalyst after calcination was 4 g/in³, including 3.41 g/in³ of titania+WO₃, 0.419 g/in³ of FeVO₄ (including 0.2 g/in³ of vanadium calculated as V₂O₅) and 0.17 g/in³ of silica.

Top coating: The top coating of Example 2.2 was prepared as the top coating of Example 2.1 except that the alumina based oxidic support was replaced by a zirconium based oxidic support (88 weight-% of ZrO₂ with 10 weight-% La₂O₃ and 2 weight-% HfO₂, having a BET specific surface area of 67 m²/g, a Dv50 of 3 micrometers and a Dv90 of 16 micrometers). Thus, the final loading of the top coating in the catalyst after calcination was 0.5 g/in³, including 0.435 g/in³ of Zr-based oxidic support, 0.056 g/in³ of zirconia and a Pd loading of 15 g/ft³.

Example 3 Testing of the Catalysts of Examples 1, 2.1 and 2.2—deNOx and N₂O Formation The NOx conversion of the fresh catalysts of Examples 1, 2.1 and 2.2 was measured, as well as the nitrous oxide (N₂O) formation, at different temperatures, namely from 200 to 325° C., (Gas Hourly Space Velocity (GHSV): 40 000 h$^{-1}$ at 200, 240, 275, 300 and 325° C.). The catalysts were allowed to stabilize at each load point and afterwards urea was injected at ANR (Ammonia to NOx Ratio) of either 1.5 (200 and 240° C.), 1.2 (275° C.) or 1.0 (300 and 325° C.) until NH$_3$ slip was observed, indicating NH$_3$ saturation of the catalyst. At each temperature, if ANR pre-conditioning was greater than 1.0, ANR was reduced to 1.0 and the system was allowed to reach equilibrium, whereupon the exhaust emissions were monitored. The results were dis-played on FIGS. 1 and 2.

As may be taken from FIG. 1, all three Pd containing V-SCR catalysts offer a high level of NOx conversion. This indicates that the PGM does not oxidize a significant fraction of NH$_3$ under these conditions and the catalyst may be used without concern for NH$_3$ oxidation up to at least 325° C. Indeed, only Example 2.1 shows any hint of NH$_3$ oxidation at 325° C. while Examples 1 and 2.2 still maintain 100% conversion at 325° C.

As may be taken from FIG. 2, all three catalysts do create a low level of N$_2$O; however, Examples 1 and 2.1 produce less N$_2$O across all measured temperatures.

Comparative Example 1 Preparation of a Mixed Catalyst (with a Pd/Zirconia and Cu-Zeolite)

The catalyst of Comparative Example 1 was prepared as the catalyst of Example 1 except that iron vanadate on the titania support was replaced by a Cu-CHA zeolitic material (Cu: 3.25 weight-%, calculated as CuO, based on the weight of the Cu-CHA, CHA having a Dv90 of 25 micrometers, a SiO$_2$: Al$_2$O$_3$ of 31, and a BET specific surface area of about 625 m$^2$/g). Further, a soluble zirconium solution (30 weight-% ZrO$_2$) was added as a binder to the mixture comprising water and Cu-CHA but no colloidal silica binder was added. The final loading of the coating in the catalyst after calcination was of 3.0 g/in$^3$, including 2.56 g/in$^3$ Cu-CHA, 0.3 g/in$^3$ of zirconia+HfO$_3$+La$_2$O$_3$, 0.13 g/in$^3$ of zirconia and a Pd loading of 15 g/ft$^3$.

Comparative Example 2 Preparation of a Mixed Catalyst (with a Pd/Ceria-Zirconia and Cu-Zeolite)

The catalyst of Comparative Example 2 was prepared as the catalyst of Comparative Example 1 except that the zirconium based oxidic support was replaced by a Ce/Zr oxidic support (40 weight-% of ceria, 50 weight-% of zirconia+HfO$_2$, 5 weight-% of La$_2$O$_3$, and 5 weight-% of Pr$_6$O$_{11}$, having a BET specific surface area of 80 m$^2$/g, a Dv90 of 15 micrometers). The final loading of the coating in the catalyst after calcination was of 3.0 g/in$^3$, including 2.56 g/in$^3$ Cu-CHA, 0.3 g/in$^3$ of ceria+zirconia+lanthanum+praseodymium, 0.13 g/in$^3$ of zirconia and a Pd loading of 15 g/ft$^3$.

Example 4 Testing of the Catalysts of Examples 1, 2.1 and 2.2 and Comparative Examples 1 to 3—HC Light-Off Performance Hydrocarbon was injected upstream of the catalysts of Examples 1, 2.1 and 2.2 and Comparative Examples 1 to 2 at different inlet temperatures (275° C., 290° C., 305° C. and 320° C.) in order to determine if it was possible to obtain a targeted temperature of 450° C. at the outlet end of each catalysts (Space velocity: 60 k/h).

As may be taken from FIG. 3, with the catalyst of Example 2.1 (layered catalyst-2 coats) it was possible after HC injection at an inlet temperature of 275° C. to attain the targeted outlet temperature of 450° C. while with the catalysts of Comparative Examples 1 and 2 (mixed catalysts), after HC injection at inlet temperatures of 275° C., 290° C., 305° C. and 320° C. it was only possible to attain an outlet temperature between 275 and 320° C., respectively. With these comparative examples, the inlet and outlet temperatures were the same. Therefore, this illustrates that little to no HC oxidation is occurring over these catalysts and that the HC oxidation reaction is quickly quenched. The catalyst from Example 2.1 achieves the targeted outlet temperature of 450° C. for all four inlet temperature steps while the catalyst from Example 2.2 achieves the targeted outlet temperature of 450° C., at inlet temperatures of 290° C. and above. This clearly demonstrates activity towards HC oxidation from the catalysts of Examples 2.1 and 2.2, despite having identical amounts of Pd as Comparative Examples 2 and 3.

Further, with the catalyst of Example 1 (mixed catalyst), it was possible after HC injection at an inlet temperature of 305° C. to obtain an increased outlet temperature of 350° C. and at an inlet temperature of 320° C. to obtain an increased outlet temperature of about 410° C.

In contrast thereto, with the catalysts of Comparative Examples 1 and 2 (mixed catalyst with Cu-CHA and not a V mixed oxide), after HC injection it was only possible to obtain an exotherm but that outlet temperature always equaled to the inlet temperature. Therefore, this example demonstrates that the presence of a mixed oxide of V permits to increase the HC light-off performance in a multifunctional catalyst.

Example 6 Testing of the Catalysts of Examples 1, 2.1, 2.2 and Comparative Example 1—deNOx and N$_2$O Formation—US-FTP+WHTC To generate the data presented in FIG. 4, each catalyst was mounted separately in a motor test cell, downstream from a 6.7 L diesel engine and a urea injector. Each catalyst was 10.5"×6" in size. The NOx conversion and N$_2$O make were assessed via the US-FTP and WHTC transient cycles, over which the test cell engine produced approximately 6.8 and 6.0 g/kWh, respectively. To assure equilibrium was achieved, the given transient cycle was run 13 times: 2× at ANR=0.1, 5× at ANR=0.8, 3× at ANR=1.0, and 3× at ANR=1.2. The data reported here was taken from the last cycle with ANR=1.2. The deNOx was reported as the mass-averaged NOx conversion and N$_2$O formation is reported as g/kWh based on the generated power over the cycle.

As may be taken from FIG. 4, the deNOx activity of Examples 1 and 2.1 were only slightly behind that of Comparative Example 2 over the US-FTP cycle. Over the somewhat warmer WHTC cycle, Examples 1, 2.1 and 2.2 all possess comparable conversion. Significantly, Examples 1, 2.1 and 2.2 also create far less N$_2$O over the US-FTP cycle than Comparative Example 1, which is an important feature to meet current and future legislation.

CITED LITERATURE

Figure 1:
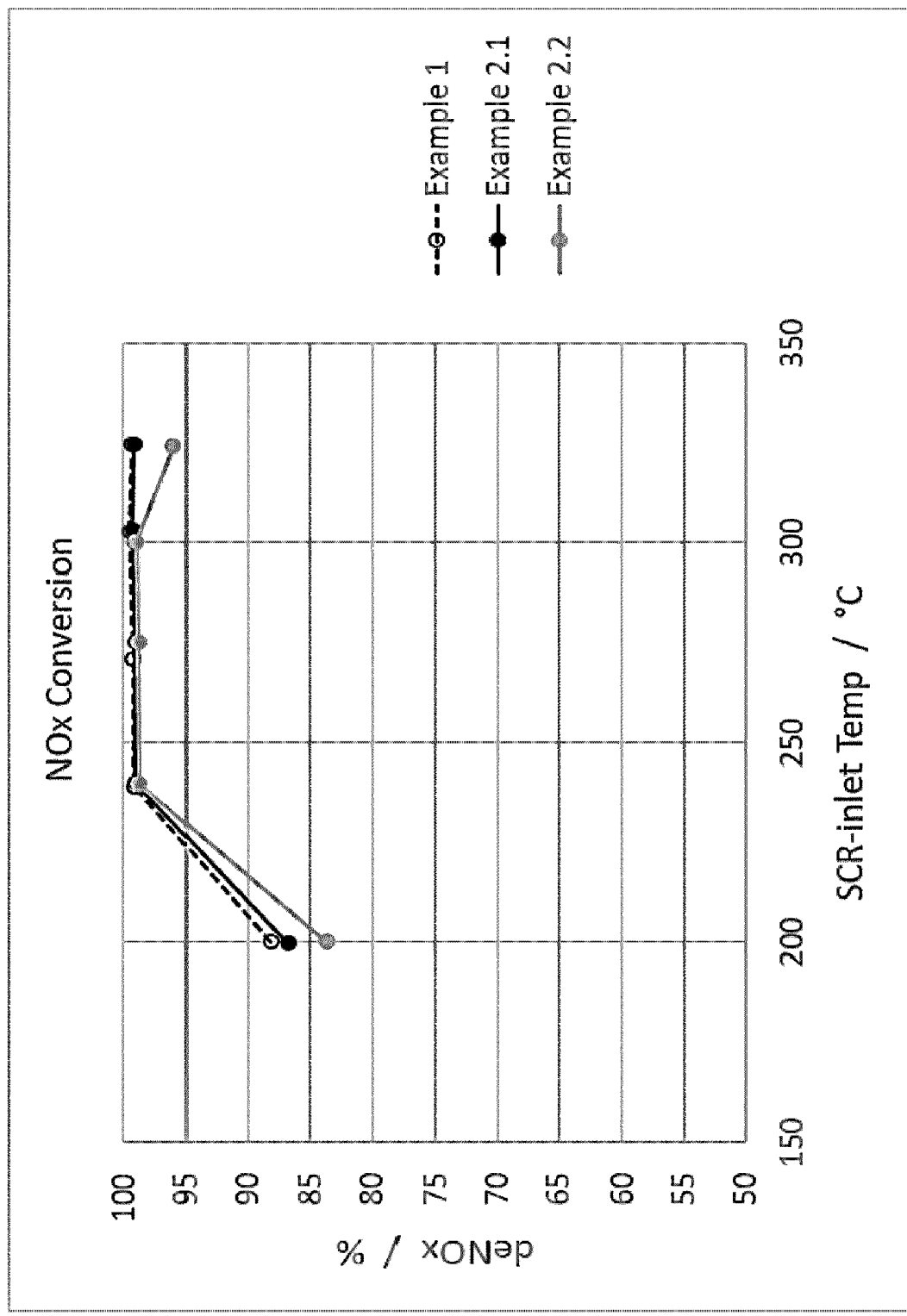
FIG. 1 shows the NOx conversion at steady-state conditions of the catalysts of Examples 1, 2.1 and 2.2 at inlet temperatures ranging from 200 to 325° C.
Figure 2:
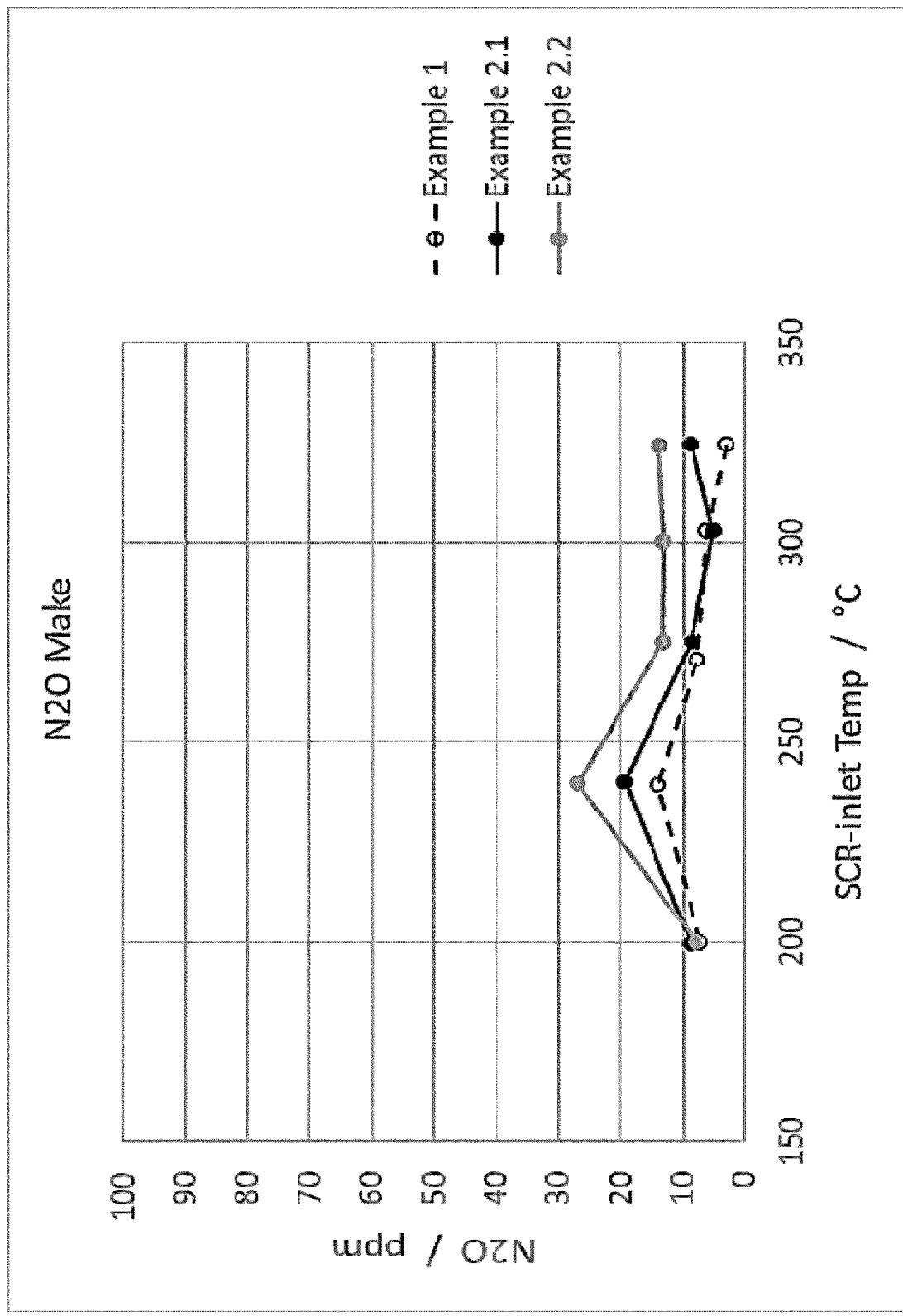
FIG. 2 shows the N$_2$O formation obtained from the catalysts of Examples 1, 2.1 and 2.2 at inlet temperatures ranging from 200 to 325° C.
Figure 3:
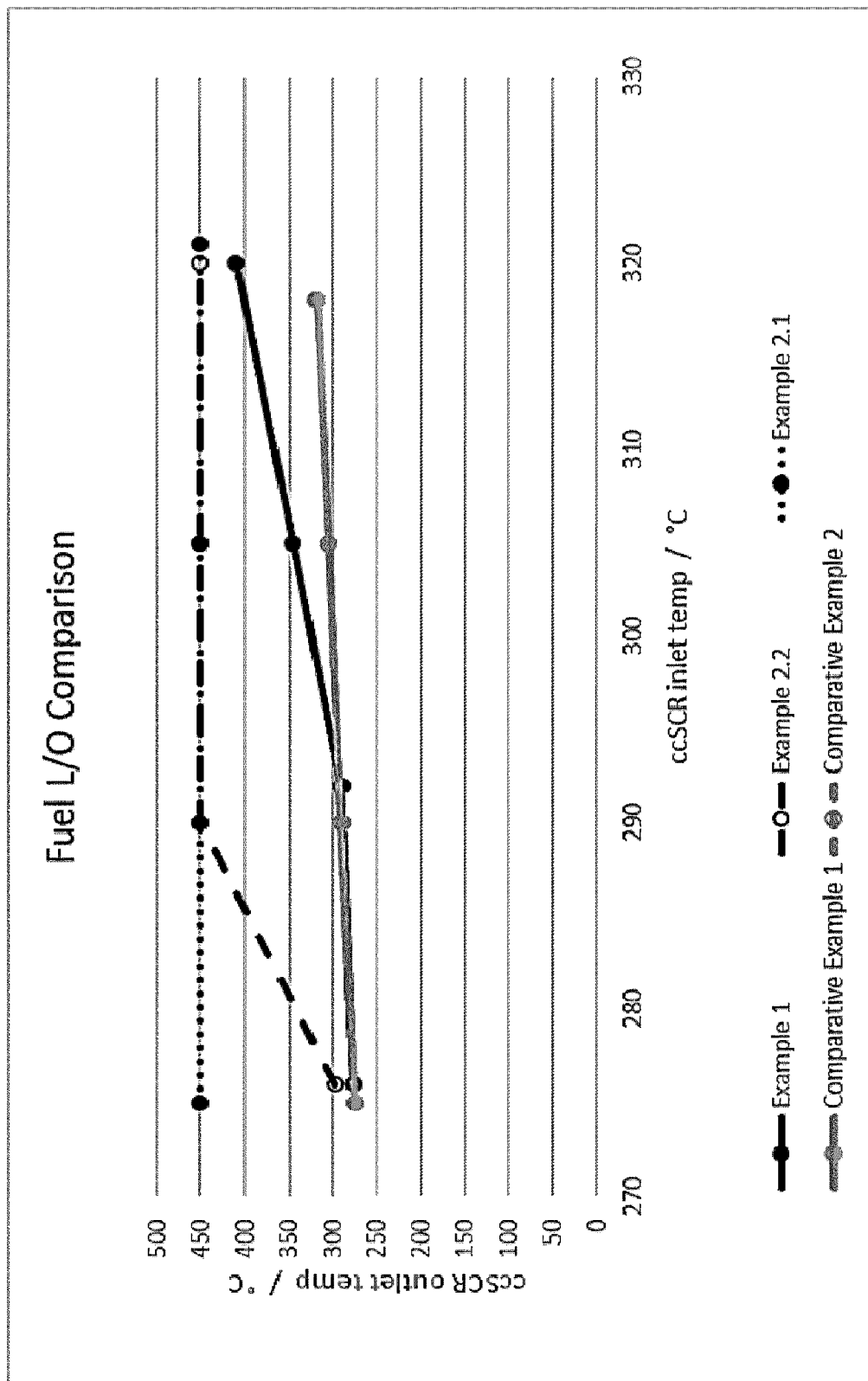
FIG. 3 shows the HC light-off performance of the catalysts of Examples 1, 2.1 and 2.2 and Comparative Examples 1 to 3.
Figure 4:
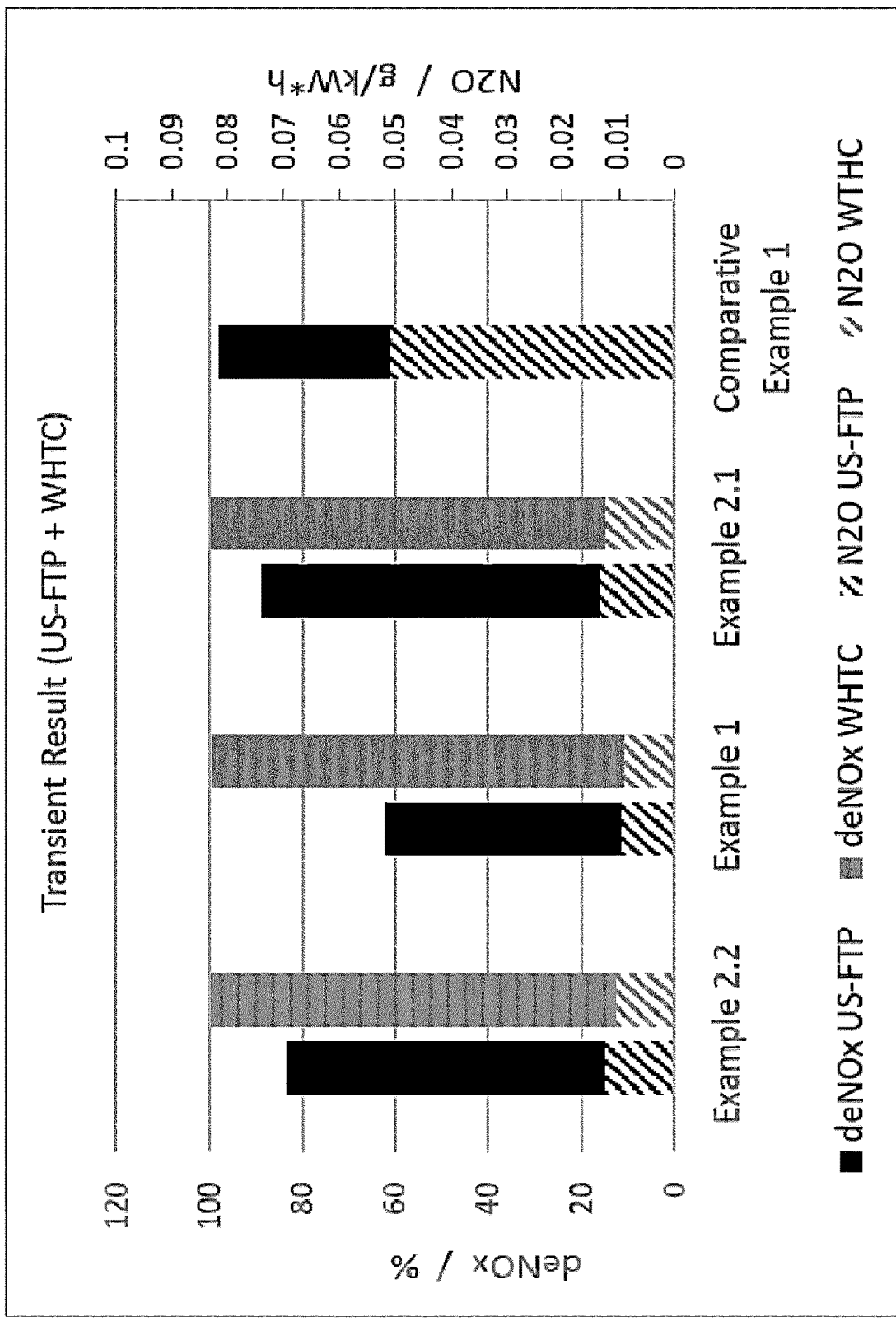
FIG. 4 shows the catalytic performances (deNOx and N$_2$O formation) of the catalysts of Examples 1, 2.1, 2.2 and Comparative Example 1.

US 2015/0375207 A1
U.S. Pat. No. 5,371,056
WO 2018/224651 A2

The invention claimed is:

1. A catalyst for the oxidation of hydrocarbon and the selective catalytic reduction of nitrogen oxides, the catalyst comprising:
  (i) a substrate comprising an inlet end, an outlet end, a substrate axial length extending from the inlet end to the outlet end, and a plurality of passages defined by internal walls of the substrate extending therethrough; and
  (ii) a coating disposed on the surface of the internal walls of the substrate, wherein the surface defines the interface between the passages and the internal walls, wherein the coating comprises a platinum group metal component supported on a first oxidic material and further comprises a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytter-bium, yttrium, molybdenum, tungsten, manganese, cobalt, nickel, copper, aluminum, and antimony, and wherein the mixed oxide is supported on a second oxidic material, wherein the coating according to (ii) consists of:
    (ii.1) a bottom coat comprising the mixed oxide supported on the second oxidic material; and
    (ii.2) a top coat comprising the platinum group metal component supported on the first oxidic material;
  wherein the bottom coat is disposed on the surface of the internal walls of the substrate over x % of the substrate axial length, wherein x ranges from 90 to 100; and
  wherein the top coat is disposed on the bottom coat over y % of the substrate axial length, wherein y ranges from 90 to 100.

2. The catalyst of claim 1, wherein the first oxidic material comprises one or more oxides.

3. The catalyst of claim 1, wherein from 75 weight-% to 100 weight-%, of the first oxidic material consist of zirconia, wherein the first oxidic material further comprises one or more of a hafnium oxide and a lanthanum oxide; or wherein from 70 weight-% to 100 weight-%, of the first oxidic material consist of alumina, wherein the first oxidic material further comprises one or more of a lanthanum oxide and a zirconium oxide.

4. The catalyst of claim 1, wherein the coating comprises the first oxidic material at a loading ranging from 0.25 to 1 g/in$^3$.

5. The catalyst of claim 1, wherein the mixed oxide is a mixed oxide of vanadium and one or more of iron, erbium, bismuth, aluminum, and antimony.

6. The catalyst of claim 1, wherein the second oxidic material supporting the mixed oxide comprises one or more oxides; wherein from 75 to 100 weight of the second oxidic material consist of titania.

7. The catalyst of claim 1, wherein the coating further comprises an oxidic binder, wherein the oxidic binder comprises one or more of zirconia, alumina, titania, silica and a mixed oxide comprising two or more of Zr, Al, Ti and Si.

8. The catalyst of claim 1, wherein the catalyst comprises the coating at a loading ranging from 2.5 to 10 g/in$^3$.

9. The catalyst of claim 1, wherein from 0 to 0.001 weight-%, of the bottom coat according to (ii.1) consist of palladium.

10. A process for preparing a catalyst for the oxidation of hydrocarbon and the selective catalytic reduction of nitrogen oxides comprising:
  (a) providing a substrate comprising an inlet end, an outlet end, a substrate axial length extending from the inlet end to the outlet end, and a plurality of passages defined by internal walls of the substrate extending therethrough;
  (b) providing one or more mixtures comprising a source of a platinum group metal component, particles of a first oxidic material, water, particles of a mixed oxide of vanadium and one or more of iron, erbium, bismuth, cerium, europium, gadolinium, holmium, lanthanum, lutetium, neodymium, praseodymium, promethium, samarium, scandium, terbium, thulium, ytterbium, yttrium, molybdenum, tungsten, manganese, cobalt, nickel, copper, aluminum and antimony, a second oxidic material and preferably an oxidic binder,
  disposing the one or more mixtures over z % of the substrate axial length, wherein z ranges from 90 to 100, wherein disposing the one or more mixtures includes:
    disposing a bottom coat on the surface of the internal walls of the substrate over x % of the substrate axial length, wherein x ranges from 90 to 100, and the bottom coat comprises the mixed oxide supported on the second oxidic material; and
    disposing a top coat on the bottom coat over y % of the substrate axial length, wherein y ranges from 90 to 100, and the top coat comprises the platinum group metal component supported on the first oxidic material, wherein the bottom coat is disposed on, and
  calcining the one or more mixtures disposed on the substrate.

11. A catalyst for the oxidation of hydrocarbon and the selective catalytic reduction of nitrogen oxides obtainable or obtained by a process according to claim 10.

12. An exhaust gas treatment system for treating exhaust gas from an internal combustion engine, preferably from a diesel engine, the system comprising a catalyst according to claim 1, and one or more of an ammonia oxidation catalyst, a diesel oxidation catalyst, a selective catalytic reduction catalyst and a catalyzed particulate filter.

* * * * *